(12) United States Patent
Depperschmidt et al.

(10) Patent No.: US 12,474,056 B1
(45) Date of Patent: Nov. 18, 2025

(54) METHOD OF OPERATING A ROTATING DETONATION COMBUSTOR

(71) Applicant: General Electric Company, Cincinnati, OH (US)

(72) Inventors: Daniel Depperschmidt, Saratoga Springs, NY (US); Kapil Singh, Rexford, NY (US); Arin Elspeth Lastufka Cross, Waterford, NY (US); Hannah Erin Bower, Rexford, NY (US); Sarah M. Monahan, Latham, NY (US); Aaron J. Glaser, Cincinnati, OH (US); Eric J. Ruggiero, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/751,527

(22) Filed: Jun. 24, 2024

(51) Int. Cl.
*F23R 7/00* (2006.01)
*F02C 5/02* (2006.01)
*F23R 3/38* (2006.01)
*F23R 3/56* (2006.01)

(52) U.S. Cl.
CPC ............. *F23R 7/00* (2013.01); *F02C 5/02* (2013.01); *F23R 3/38* (2013.01); *F23R 3/56* (2013.01)

(58) Field of Classification Search
CPC ..................... F23R 7/00; F02C 5/02
See application file for complete search history.

(56) References Cited

U.S. PATENT DOCUMENTS

| | | | |
|---|---|---|---|
| 8,117,828 B2 | 2/2012 | Synder et al. | |
| 9,777,627 B2 | 10/2017 | Snyder | |
| 9,920,689 B2 | 3/2018 | Nalim | |
| 11,473,780 B2* | 10/2022 | Pal | F02K 7/02 |
| 2011/0088370 A1* | 4/2011 | Daniau | F23R 7/00 |
| | | | 60/39.78 |

(Continued)

FOREIGN PATENT DOCUMENTS

CN 117145632 A 12/2023

OTHER PUBLICATIONS

Monahan et al., "Geometry Parameter Variation for C2H4-Fueled Rotating Detonation Combustor," AIAA 2019-4043. AIAA Propulsion and Energy 2019 Forum. Aug. 2019.

(Continued)

*Primary Examiner* — Katheryn A Malatek
(74) *Attorney, Agent, or Firm* — Venable LLP; Edward A. Kmett; Michele V. Frank

(57) ABSTRACT

A method of operating a rotating detonation combustor includes providing a flow of air through an air inlet to flow into a detonation chamber, providing a flow of fuel from at least one fuel injector into the detonation chamber, mixing the flow of the fuel and the flow of the air in the detonation chamber to generate a fuel-air mixture, detonating the fuel-air mixture in the detonation chamber to generate rotating detonation waves within the detonation chamber, and controlling, during operation of the rotating detonation combustor from a first power operating state to a second power operating state, different from the first power operating state, the air inlet wall to control the flow of the air through the air inlet into the detonation chamber to control a discharge coefficient and an operating mode within the detonation chamber.

20 Claims, 9 Drawing Sheets

(56) References Cited

U.S. PATENT DOCUMENTS

| | | | |
|---|---|---|---|
| 2015/0204240 A1* | 7/2015 | Robic | F23R 7/00 |
| | | | 60/39.23 |
| 2017/0146244 A1 | 5/2017 | Kurosaka et al. | |
| 2018/0080412 A1 | 3/2018 | Mizener et al. | |
| 2018/0180289 A1 | 6/2018 | Lavertu, Jr. et al. | |
| 2018/0231256 A1* | 8/2018 | Pal | F02C 5/02 |
| 2018/0274787 A1 | 9/2018 | Greene et al. | |
| 2018/0355822 A1 | 12/2018 | Vise et al. | |
| 2018/0356093 A1 | 12/2018 | Pal et al. | |
| 2020/0149496 A1 | 5/2020 | Singh et al. | |
| 2020/0166212 A1 | 5/2020 | Singh et al. | |
| 2021/0164405 A1 | 6/2021 | Haynes et al. | |

OTHER PUBLICATIONS

Rankin et al., "Experimental and Numerical Evaluation of Pressure Gain Combustion in a Rotating Detonation Engine," AIAA 2015-0877. 53rd AIAA Aerospace Sciences Meeting. Jan. 2015.
Tangirala et al., "Rotating Detonation Combustor—Computational Investigations," International Constant Volume and Detonation Combustion Workshop, Presentation-RDEnum9, Poitiers, FR, Jun. 2017.
Yellapantula et al., "A numerical study of H 2-air rotating detonation combustor," 26th ICDERS, Jul. 30-Aug. 4, 2017 Boston, MA, USA.

* cited by examiner

METHOD OF OPERATING A ROTATING DETONATION COMBUSTOR

GOVERNMENT INTEREST

This invention was made with government support under FA8650-19-D-2507 awarded by the U.S. Department of Defense. The government has certain rights in the invention.

TECHNICAL FIELD

The present disclosure relates generally to a method of operating a rotating detonation combustor.

BACKGROUND

Aircraft engines generally include a combustor in which a mixture of air and fuel is ignited and burned. Some combustors are arranged as a rotating detonation combustor in which the air and fuel mixture is detonated to generate a rotating detonation wave. The rotating detonation wave traverses around a detonation chamber such that the detonation wave travels around a combustion chamber centerline axis. The rotating detonation wave also travels axially through the detonation chamber to exhaust combustion gases through an outlet of the detonation chamber.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
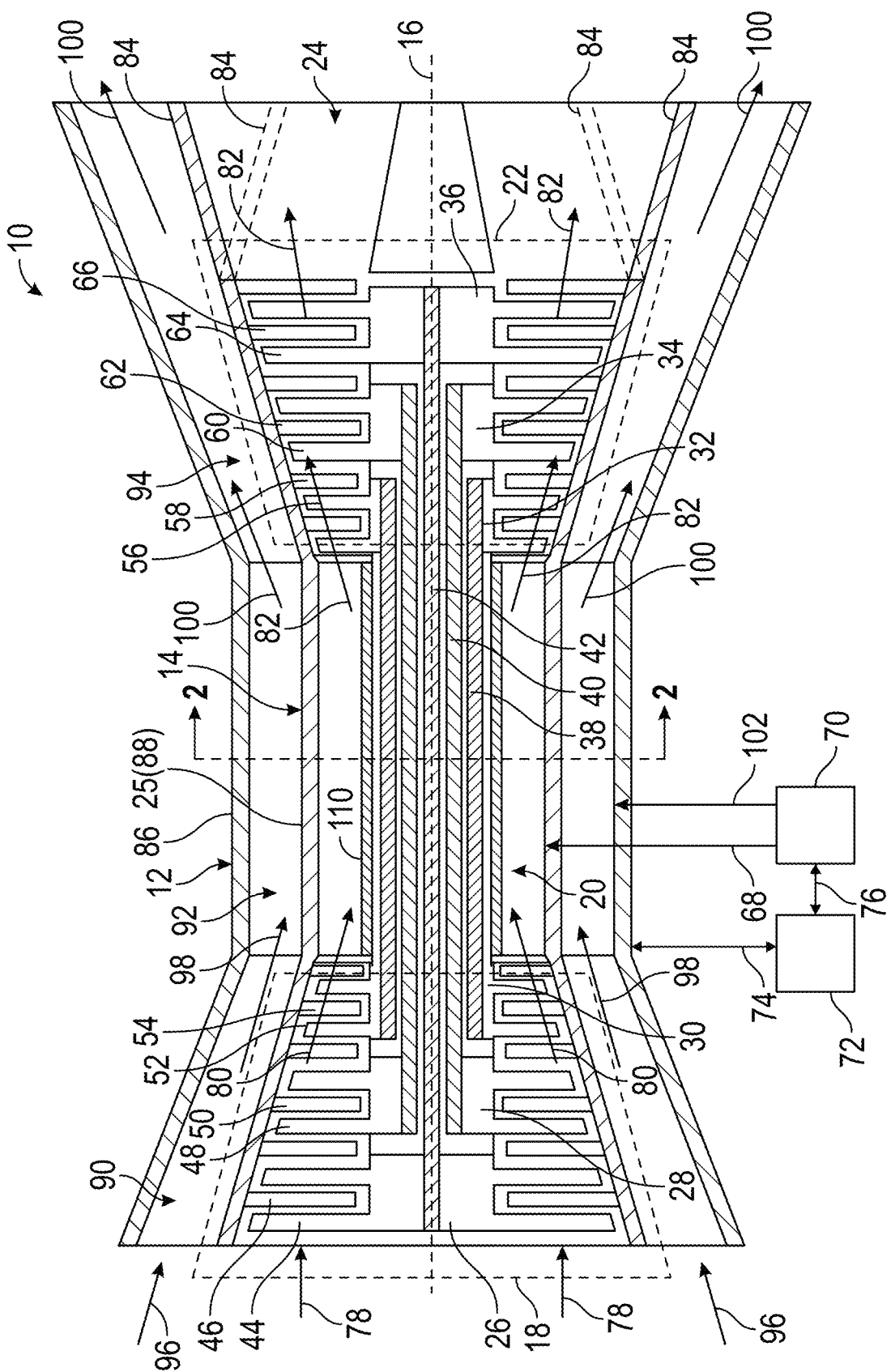
FIG. 1 is a schematic cross-sectional view of a propulsion system, according to an aspect of the present disclosure.

Features, advantages, and embodiments of the present disclosure are set forth or are apparent from a consideration of the following detailed description, drawings, and claims. Moreover, the following detailed description is exemplary and is intended to provide an explanation without limiting the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Aircraft engines generally include a combustor in which a mixture of air and fuel is ignited and burned. Some combustors are arranged as a rotating detonation combustor in which the air and fuel mix together and react to generate a rotating detonation wave. The rotating detonation wave traverses around a detonation chamber such that the detonation wave travels around a combustion chamber longitudinal centerline axis. The rotating detonation wave also travels axially through the detonation chamber to exhaust combustion gases through an outlet of the detonation chamber. One concern with rotating detonation combustors is the ability to adjust the number of detonation waves within the combustion chamber based on different engine power requirements throughout an engine cycle.

The present disclosure provides a technique to control a discharge coefficient (e.g., the area in which reactants fill the detonation chamber with respect to a geometric area of the detonation chamber) and a specific detonation operating mode within the detonation chamber for different power requirements. In the present disclosure, an air inlet gap for providing a flow of compressed air into the detonation chamber is adjusted based on the power requirements. The adjustment of the air inlet gap adjusts the mass flow rate of the airflow through the air inlet into the detonation chamber, as well as the nature of the reactant flow field, including flow directionality, flow velocity, and the effective fill area. Alterations to the geometry of the air inlet gap also adjusts the discharge coefficient of the system and/or the resulting detonation operating mode of the combustor.

The operating mode refers to the number of detonation waves, the orientation of the detonation waves, and the presence or orientation or number of detrimental acoustic waves. The operating mode is determined by the inlet conditions supplied to the system and physics dictating detonation phenomenon. One key parameter is the fill height of the rotating detonation combustor. The fill height is the axial penetration of the reactants that occurs after one detonation wave passes before the subsequent detonation wave consumes the reactants. The fill height can be adjusted not only by increasing the total mass flow of air to the system, but also by adjusting the air gap. For example, the air gap can be reduced, which results in a more truncated radial height of the reactant jet in the channel, with the injected reactants flowing faster and therefore having a higher fill height. The resulting flow field of the injector is that the "effective" volume of the channel is less than the physical volume of the channel; the reactant gases are not occupying the full physical width of the channel. This reduction of the "effective volume" corresponds to a reduction of the discharge coefficient of the injector.

Additionally, reducing the air gap size and, therefore increasing the pressure drop required to supply a given mass flow, increases the "stiffness", or resilience of the injector to allow for back flow due to the local pressure spikes of the passing detonation waves. This can also positively impact detonation operation.

Adjusting the effective injector area, effective fill volume, and stiffness of the injector can impact whether detonation waves form and whether they bifurcate into more than one wave. As the waves travel about the combustor, the waves consume the reactants. Ideally, the waves do not consume too much too fast, or too little too slowly, such that the mixture becomes either too lean or too rich to keep the detonation self-sustained. There needs to be a consistent cycle of consumption and refresh, and the number of waves may impact the consistency of the cycle.

FIG. 1 is a schematic cross-sectional view of a propulsion system 10, according to an aspect of the present disclosure. The propulsion system 10 may be a combined-cycle propulsion system that includes a ramjet engine 12 and a turbo-engine 14, each of which extends about a longitudinal centerline axis 16. While the propulsion system 10 depicted in FIG. 1 includes both the ramjet engine 12 and the turbo-engine 14, the propulsion system 10 may include either the ramjet engine 12 or the turbo-engine 14, and need not include both. The following description, however, will be made with the arrangement of FIG. 1 including both the ramjet engine 12 and the turbo-engine 14. The turbo-engine 14 may be, for example, a turbojet engine that includes, in a serial flow relationship and encased within a turbo-engine outer casing 25 that extends circumferentially about the longitudinal centerline axis 16, a compressor section 18, a turbine engine combustion section 20 (shown generally in FIG. 1), a turbine section 22, and an exhaust section 24. The compressor section 18 includes a low-pressure compressor (LPC) 26, an intermediate-pressure compressor (IPC) 28, and a high-pressure compressor (HPC) 30. The turbine section 22 includes a high-pressure turbine (HPT) 32, an intermediate-pressure turbine (IPT) 34, and a low-pressure turbine (LPT) 36. The HPT 32 and the HPC 30 are drivingly connected together via a high-pressure shaft 38, the IPT 34 and the IPC 28 are drivingly connected together via an intermediate-pressure shaft 40, and the LPT 36 and the LPC 26 are drivingly connected together via a low-pressure shaft 42.

The LPC 26 includes a plurality of low-pressure compressor rotors that each has a plurality of circumferentially spaced apart low-pressure rotor blades 44 extending radially outward therefrom, and a plurality of circumferentially spaced apart low-pressure stator vanes 46 extending radially inward from the turbo-engine outer casing 25. Similarly, the IPC 28 includes a plurality of intermediate-pressure compressor rotors that each has a plurality of circumferentially spaced apart intermediate-pressure rotor blades 48 extending radially outward therefrom, and a plurality of circumferentially spaced apart intermediate-pressure stator vanes 50 extending radially inward from the turbo-engine outer casing 25. Likewise, the HPC 30 includes a plurality of high-pressure compressor rotors that each has a plurality of circumferentially spaced apart high-pressure rotor blades 52 extending radially outward therefrom, and a plurality of circumferentially spaced apart high-pressure stator vanes 54 extending radially inward from the turbo-engine outer casing 25. As will be described below, a volume of air passing through the compressor section 18 is increasingly compressed by the low-pressure rotor blades 44, the low-pressure stator vanes 46, the intermediate-pressure rotor blades 48, the intermediate-pressure stator vanes 50, the high-pressure rotor blades 52, and the high-pressure stator vanes 54 before flowing into the turbine engine combustion section 20.

The HPT 32 includes a plurality of high-pressure turbine rotors that each has a plurality of circumferentially spaced apart high-pressure rotor blades 56 extending radially outward therefrom, and a plurality of circumferentially spaced apart high-pressure stator vanes 58 extending radially inward from the turbo-engine outer casing 25. Similarly, the IPT 34 includes a plurality of intermediate-pressure turbine rotors that each has a plurality of circumferentially spaced apart intermediate-pressure rotor blades 60 extending radially outward therefrom, and a plurality of circumferentially spaced apart intermediate-pressure stator vanes 62 extending radially inward from the turbo-engine outer casing 25. Likewise, the LPT 36 includes a plurality of low-pressure turbine rotors that each has a plurality of circumferentially spaced apart low-pressure rotor blades 64 extending radially outward therefrom, and a plurality of circumferentially spaced apart low-pressure stator vanes 66 extending radially inward from the turbo-engine outer casing 25. As will be described below, a volume of combustion gases generated by the turbine engine combustion section 20 and passing through the turbine section 22 is increasingly expanded by the high-pressure rotor blades 56, the high-pressure stator vanes 58, the intermediate-pressure rotor blades 60, the intermediate-pressure stator vanes 62, the low-pressure rotor blades 64, and the low-pressure stator vanes 66 before flowing into the exhaust section 24. In addition, as will be described below, work is extracted from the combustion gases by each of the HPT 32, the IPT 34, and the LPT 36 so as to cause each of the HPT 32, the IPT 34, and the LPT 36 to rotate, thereby supporting operation of the HPC 30, the IPC 28, and the LPC 26, respectively.

The turbine engine combustion section 20 will be described in more detail below, but, briefly, the turbine engine combustion section 20 receives a flow of fuel 68 from a fuel supply system 70. The fuel supply system 70, although not shown in FIG. 1, may include one or more fuel tanks arranged in various locations within an aircraft upon which the propulsion system 10 is mounted, one or more fuel pumps, and one or more fuel supply lines that provide the fuel 68 to the turbine engine combustion section 20. The fuel supply system 70, as well as the propulsion system 10, are controlled by an engine controller 72 that communicates with the propulsion system 10 via a communication channel 74, and, that communicates with the fuel supply system 70 via a communication channel 76. The communication channel 74 and the communication channel 76 may be a wired communication channel or a wireless communication channel arranged on the aircraft.

In operation of the turbo-engine 14, a volume of air 78 enters the compressor section 18, and the air 78 is compressed by LPC 26, the IPC 28, and the HPC 30 to generate compressed air 80. The compressed air 80 is then provided to the turbine engine combustion section 20 where, as will be described in more detail below, the compressed air 80 is mixed with the fuel 68 and a fuel-air mixture is then ignited (or detonated) and burned to generate combustion gases 82. The combustion gases 82 flow through the turbine section 22 where work or kinetic energy is extracted from the combustion gases 82 to cause each of the HPT 32, the IPT 34, and the LPT 36 to rotate, thereby driving and supporting operation of each of the HPC 30, the IPC 28, and the LPC 26, respectively. The combustion gases 82 are then exhausted through the exhaust section 24 to provide thrust. The exhaust section 24 may include a variable exhaust nozzle 84 that may be controlled via an actuator (not shown) to vary an angle of the variable exhaust nozzle 84 (shown in dashed lines) so as to control the thrust amount and the direction of the thrust.

The ramjet engine 12 in FIG. 1 is shown to be arranged radially outward of the turbo-engine 14 and extending circumferentially about the longitudinal centerline axis 16. This arrangement, however, is merely one example of the ramjet engine 12. Instead, the ramjet engine 12 may extend only partially annularly about the longitudinal centerline axis 16, or may be arranged as a linear-type ramjet engine that is separate from the turbo-engine 14. Thus, the following description of the ramjet engine 12 is merely exemplary and the present disclosure is not limited to the configuration of the ramjet engine 12 shown in FIG. 1. In the FIG. 1 aspect, the ramjet engine 12 includes a ramjet engine outer casing 86, and the turbo-engine outer casing 25 may also function as a ramjet engine inner casing 88. The ramjet engine 12 includes, in a serial flow relationship, a ramjet inlet section 90, a ramjet combustion section 92 (shown generally in FIG. 1), and a ramjet exhaust section 94, each of which is defined between the ramjet engine inner casing 88 and the ramjet engine outer casing 86. The ramjet inlet section 90 is arranged as a converging section so as to compress a flow of air entering the ramjet inlet section 90. While not shown in FIG. 1, the ramjet inlet section 90 may include an isolator portion that, in a case when supersonic airflow enters the ramjet inlet section 90, organizes shockwaves of the supersonic airflow within the ramjet inlet section 90 so as to provide a sub-sonic airflow from the ramjet inlet section 90 to the ramjet combustion section 92. As will be described below, the ramjet combustion section 92 may be similar to the turbine engine combustion section 20 of the turbo-engine 14, and the ramjet combustion section 92 generates combustion gases that flow into the ramjet exhaust section 94. The ramjet exhaust section 94 may be arranged as a diverging exhaust section so as to expand the combustion gases generated by the ramjet combustion section 92 to provide thrust. The variable exhaust nozzle 84 may also be controlled so as to control the amount and the direction of the thrust from the ramjet exhaust section 94.

In operation of the ramjet engine 12, a volume of air 96 enters the ramjet inlet section 90. The air 96, as was described above, may enter the ramjet inlet section 90 as a supersonic airflow. The ramjet inlet section 90 compresses the air 96, and, in the case when the air 96 is a supersonic airflow, organizes shockwaves within the ramjet inlet section 90, and provides compressed air 98 to the ramjet combustion section 92. As will be described below, in the ramjet combustion section 92, fuel 102 is provided by the fuel supply system 70 to the ramjet combustion section 92, and the fuel 102 mixes with the compressed air 98 to generate a fuel-air mixture that is then ignited (or detonated) within the ramjet combustion section 92 to generate ramjet combustion gases 100. The fuel 102 may be the same as the fuel 68 provided to the turbine engine combustion section 20 of the turbo-engine 14, or may be a different type of fuel. For example, the fuel 68 may be a hydrocarbon-type fuel, such as Jet A fuel, while the fuel 102 may be a more highly reactive fuel, such as hydrogen. The ramjet combustion gases 100 then flow through the ramjet exhaust section 94, where the ramjet combustion gases 100 are expanded through the ramjet exhaust section 94 to provide thrust.

In the propulsion system 10 of FIG. 1, the turbo-engine 14 may be operated through a particular airspeed of the aircraft upon which the propulsion system 10 is mounted, while the ramjet engine 12 may be operated at higher airspeeds of the aircraft. For example, the turbo-engine 14 may be operated during ground operations up through an aircraft airspeed of about Mach 1.5, while the ramjet engine 12 may be operated for aircraft airspeeds above Mach 1.0. While not shown in FIG. 1, the turbo-engine 14 may include an isolator system upstream of the compressor section 18 so as to isolate (or cocoon) the turbo-engine 14 during the higher speed operations in which the ramjet engine 12 is operable. That is, the isolator system may block the air 78 from entering the compressor section 18 at higher airspeeds, and the engine controller 72 controls the turbo-engine 14 and the fuel supply system 70 so as to stop the flow of the fuel 68 and to stop the operation of the turbo-engine 14. Alternatively, bleed air passages (not shown) may provide a flow of air from the ramjet engine 12 to the compressor section 18 of the turbo-engine 14 during the higher speed operations so as to maintain some minimal level of operation of the turbo-engine 14 during the higher speed operations, even though the isolator system may block the flow of the air 78.

Figure 2:
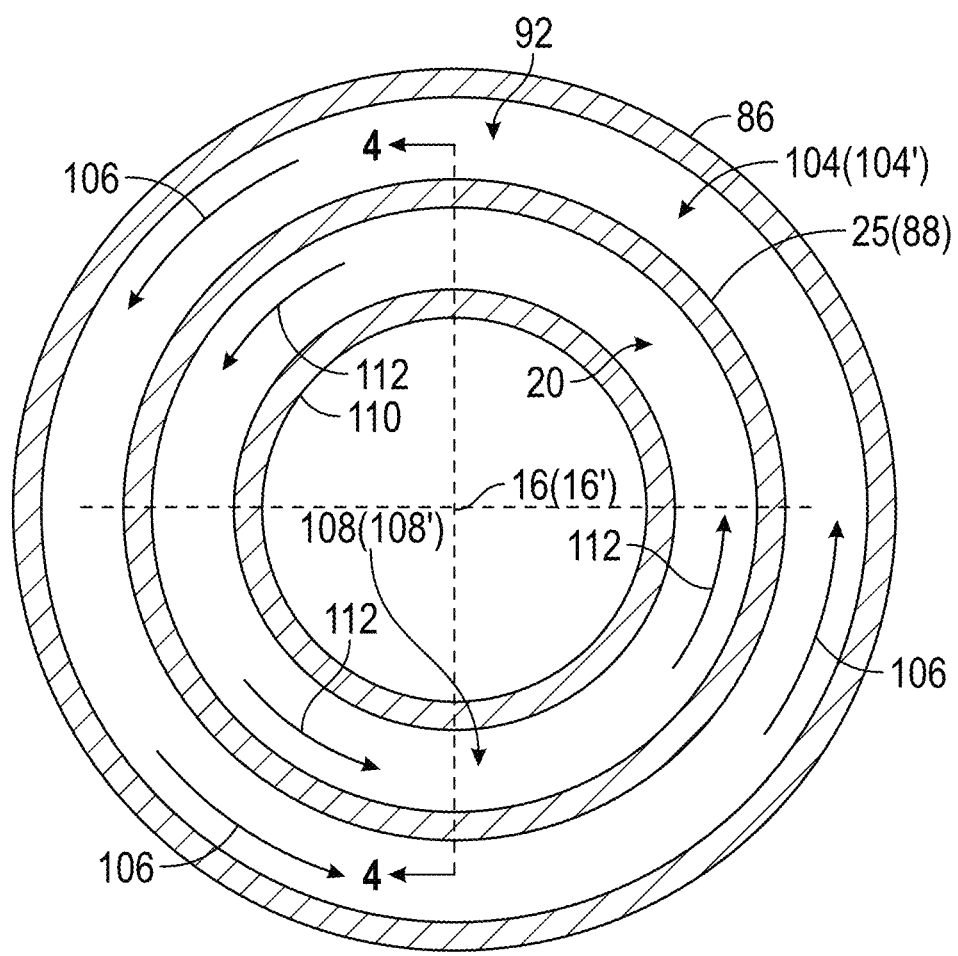
FIG. 2 is a schematic cross-sectional view of a ramjet combustion section and a combustion section of a turbo-engine, taken at plane 2-2 of FIG. 1, according to an aspect of the present disclosure.

FIG. 2 is a schematic cross-sectional view of the ramjet combustion section 92 and the turbine engine combustion section 20 of the turbo-engine 14, taken at plane 2-2 of FIG. 1, according to an aspect of the present disclosure. In FIG. 2, cross sections through each of the high-pressure shaft 38, the intermediate-pressure shaft 40, and the low-pressure shaft 41 have been omitted merely for clarity. In the FIG. 2 aspect, the ramjet combustion section 92 is configured as a rotating detonation combustor 104 (shown generally in FIG. 2 and a detailed description is provided below) arranged between the ramjet engine outer casing 86 and the ramjet engine inner casing 88. The rotating detonation combustor 104 extends circumferentially about the longitudinal centerline axis 16 such that detonation waves 106 (shown schematically by arrows representing a flow of detonation waves) within the rotating detonation combustor 104 travel circumferentially about the longitudinal centerline axis 16. The rotating detonation combustor 104 of the ramjet engine 12 will be described in more detail below.

Similarly, in the FIG. 2 aspect, the turbine engine combustion section 20 of the turbo-engine 14 is configured as a rotating detonation combustor 108 (shown generally in FIG. 2; a detailed description is provided below) that extends between the turbo-engine outer casing 25 and a turbo-engine inner casing 110. The rotating detonation combustor 108 extends circumferentially about the longitudinal centerline axis 16 such that rotating detonation waves 112 (shown schematically by arrows representing a flow of detonation waves) within the rotating detonation combustor 108 travel circumferentially about the longitudinal centerline axis 16. The rotating detonation combustor 108 will also be described below.

Figure 3:
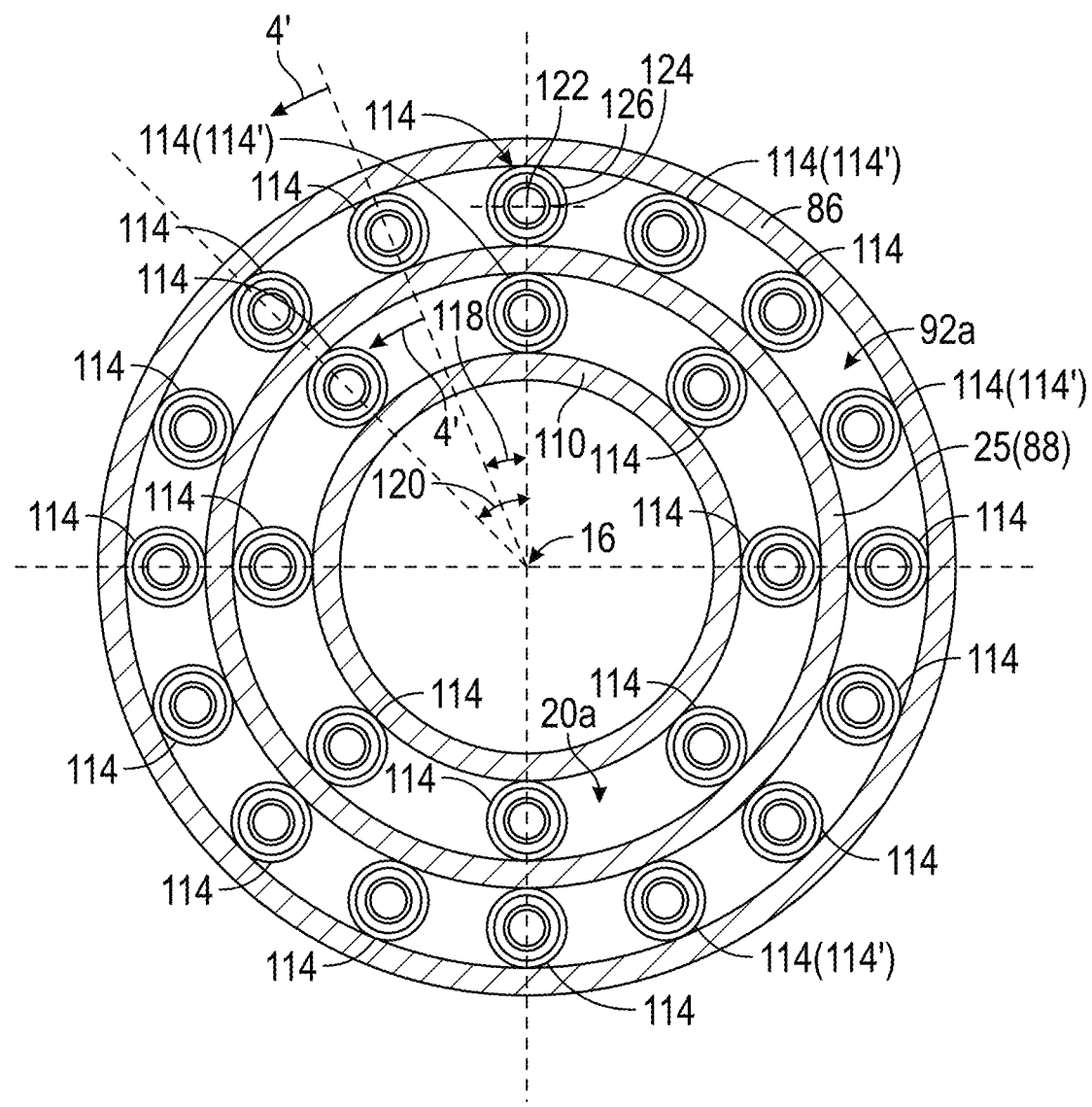
FIG. 3 is a schematic cross-sectional view of an alternate ramjet combustion section and an alternate combustion section of the turbo-engine to that shown in FIG. 2, according to an aspect of the present disclosure.

FIG. 3 is a schematic cross-sectional view of an alternate ramjet combustion section 92*a* of the ramjet engine 12 and an alternate combustion section 20*a* of the turbo-engine 14 to that shown in FIG. 2, according to an aspect of the present disclosure. In the FIG. 3 aspect, the alternate ramjet combustion section 92*a* includes a plurality of rotating detonation combustors 114 that are arranged between an inner casing 124 and an outer casing 126 that each extends about a combustor centerline axis 122. The plurality of rotating detonation combustors 114 of the alternate combustion section 92*a* are circumferentially spaced apart from one another about the longitudinal centerline axis 16. For example, the rotating detonation combustors 114 of the alternate combustion section 92*a* may be spaced apart from one another by an angular amount 118. In addition, the plurality of rotating detonation combustors 114 of the alternate combustion section 20*a* are circumferentially spaced apart about the longitudinal centerline axis 16. For example, the rotating detonation combustors 114 of the alternate combustion section 20*a* may be spaced apart from one another by an angular amount 120. Each of the rotating detonation combustors 114 of the alternate combustion section 20*a* and of the alternate combustion section 92*a* may include the same configuration, albeit on a smaller scale, as the rotating detonation combustor 108 described below. The configuration of the rotating detonation combustor 104, the rotating detonation combustor 108 and each of the rotating detonation combustors 114 will now be described.

Figure 4:
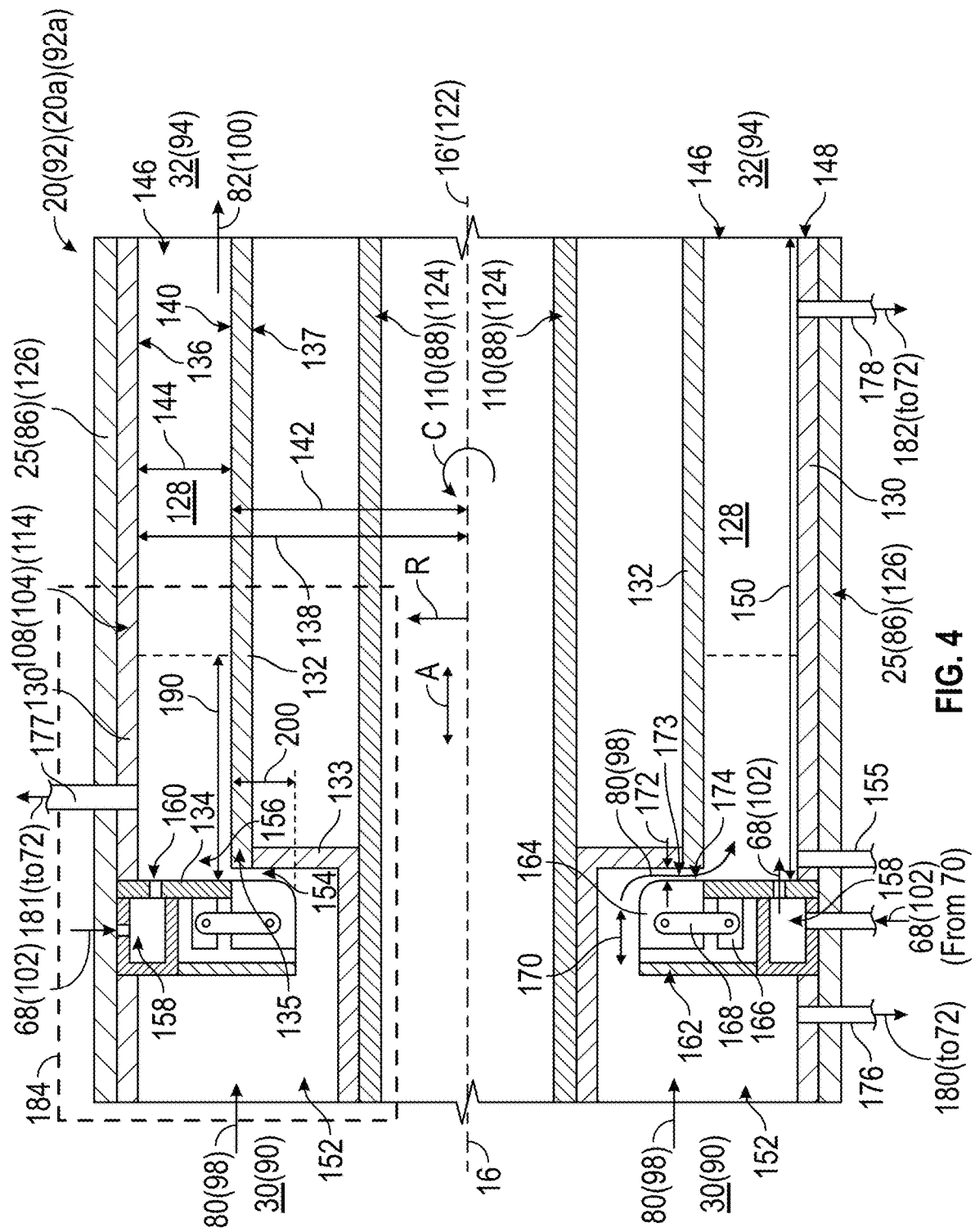
FIG. 4 is a partial cross-sectional view of a rotating detonation combustor, taken at plane 4-4 of FIG. 2, according to an aspect of the present disclosure.

FIG. 4 is a partial cross-sectional view of the rotating detonation combustor 108, taken at plane 4-4 of FIG. 2, according to an aspect of the present disclosure. In FIG. 4, the rotating detonation combustor 108 for the turbine engine combustion section 20 is shown, but, the configuration of FIG. 4 is equally applicable to the rotating detonation combustor 104 of the ramjet combustion section 92 (FIG. 1). In addition, the FIG. 4 configuration is also applicable for any of the rotating detonation combustors 114 (FIG. 3) of the ramjet combustion section 92*a*, or for any of the rotating detonation combustors 114 (FIG. 3) of the turbine engine combustion section 20*a*. That is, the cross-sectional view of FIG. 4 may also be applicable to a plane 4-4 of FIG. 3 for the rotating detonation combustor 114. Thus, in FIG. 4, reference numerals for elements that are specific only to the rotating detonation combustor 104 or only to the rotating detonation combustor 114 are shown in parentheses, while non-parenthetical reference numerals are applicable to each of the rotating detonation combustor 108, the rotating detonation combustor 104, and the rotating detonation combustor 114, even though the non-parenthetical reference numerals are described with regard to the rotating detonation combustor 108. Therefore, each of the rotating detonation combustor 108, the rotating detonation combustor 104, and each of the plurality of rotating detonation combustors 114 may have the same general configuration as that shown in FIG. 4.

In FIG. 4, both the rotating detonation combustor 108 and the rotating detonation combustor 104 extend about a combustor longitudinal centerline axis 16', which corresponds to and is congruent with the longitudinal centerline axis 16 (FIG. 1) of the propulsion system 10. The rotating detonation combustor 108 defines an axial direction A extending parallel to the combustor centerline axis 16', a radial direction R extending perpendicularly outward from the combustor centerline axis 16', and a circumferential direction C extending about the combustor centerline axis 16'. As was described above for FIG. 1, the rotating detonation combustor 108 of the turbine engine combustion section 20 is arranged between the turbo-engine inner casing 110 and the turbo-engine outer casing 25, while the rotating detonation combustor 104 of the ramjet combustion section 92 is arranged between the ramjet engine inner casing 88 and the ramjet engine outer casing 86. On the other hand, in the case when the FIG. 4 aspect is applicable to each of the plurality of rotating detonation combustors 114 (FIG. 3), the rotating detonation combustor 114 extends about the combustor centerline axis 122. In addition, as was described above, the rotating detonation combustor 114 is arranged between the inner casing 124 and an outer casing 126.

The rotating detonation combustor 108 includes a detonation chamber 128 defined by an outer wall 130, an inner wall 132, and an upstream wall 134. Each of the outer wall 130, the inner wall 132, and the upstream wall 134 is annular and extends circumferentially about the combustor longitudinal centerline axis 16' so as to define the detonation chamber 128. An inner surface 136 of the outer wall 130 is arranged at a radial distance 138 from the combustor longitudinal centerline axis 16', and an outer surface 140 of the inner wall 132 is arranged at a radial distance 142 from the combustor longitudinal centerline axis 16', thereby defining a radial height 144 of the detonation chamber 128. The inner wall 132 also includes a radial wall 133 that extends radially inward from an upstream end 135 of the inner wall 132, and that extends circumferentially about the combustor centerline axis 16'. As will be described in more detail below, at least a portion of the radial wall 133 and the upstream end 135 of the inner wall 132 forms a downstream side of an air inlet 154. The radial wall 133 and the inner wall 132 may be formed as a unitary wall that defines a centerbody 137 that extends circumferentially about the combustor longitudinal centerline axis 16'. The rotating detonation combustor 108 includes an outlet 146 at a downstream end 148 of the detonation chamber 128. The detonation chamber 128 has a detonation chamber length 150 defined from the upstream wall 134 to the outlet 146. The outlet 146 is in fluid communication with the HPT 32 to provide the flow of the combustion gases 82 to the HPT 32, or, for the rotating detonation combustor 104, the outlet 146 is in fluid communication with the ramjet exhaust section 94 to provide the flow of the ramjet combustion gases 100 to the ramjet exhaust section 94.

The rotating detonation combustor 108 also includes an air plenum 152 arranged upstream of the detonation chamber 128. The air inlet 154 is in fluid communication with the air plenum 152 and with the detonation chamber 128, and the air inlet 154 is arranged at an upstream end 156 of the of the detonation chamber 128. The air plenum 152 is either in fluid communication with the HPC 30 (for the rotating detonation combustor 108 of the turbine engine combustion section 20) to receive a flow of the compressed air 80 from the HPC 30, or is in fluid communication with the ramjet inlet section 90 (for the rotating detonation combustor 104 of the ramjet combustion section 92) to receive a flow of the compressed air 98 from the ramjet inlet section 90. As will be described in more detail below, either the compressed air 80 or the compressed air 98 flows from the air plenum 152 and through the air inlet 154 into the detonation chamber 128. The air inlet 154 may extend annularly about the combustor longitudinal centerline axis 16' and may have a radial length 200. The air plenum 152 extends annularly about the combustor longitudinal centerline axis 16'.

The rotating detonation combustor 108 further includes a fuel plenum 158 that is in fluid communication with the fuel supply system 70 to receive either the fuel 68 (for the rotating detonation combustor 108 of the turbine engine combustion section 20) or the fuel 102 (for the rotating detonation combustor 104 of the ramjet combustion section 92). The fuel plenum 158 may extend annularly about the combustor longitudinal centerline axis 16', or may be a plurality of fuel plenums 158 that each extends partially annularly about the combustor longitudinal centerline axis 16'. In the FIG. 4 aspect, the upstream wall 134 defines, in part, the fuel plenum 158.

The rotating detonation combustor 108 further includes a plurality of fuel injectors 160 (two shown in FIG. 4) that are arranged to inject the fuel 68 or to inject the fuel 102 into the detonation chamber 128. In the FIG. 4 aspect, the plurality of fuel injectors 160 extend through the upstream wall 134, and provide fluid communication between the fuel plenum 158 and the detonation chamber 128. The plurality of fuel injectors 160 are arranged circumferentially spaced apart about the combustor longitudinal centerline axis 16'. The flow of the fuel 68 or the flow of the fuel 102 to the fuel plenum 158, and the flow of the fuel 68 or the fuel 102 from the fuel plenum 158 through the at least one fuel injector 160, is controlled by the engine controller 72 (FIG. 1). As will be described in more detail below, the fuel 68 or the fuel 102 injected via the plurality of fuel injectors 160 mixes within the detonation chamber 128 with the compressed air 80 or with the compressed air 98 flowing through the air inlet 154 to form a fuel-air mixture within the detonation chamber 128 that is then detonated by a spark from one or more ignitors 155 (one shown in FIG. 4) to generate rotating detonation waves within the detonation chamber 128.

In the FIG. 4 aspect, the rotating detonation combustor 108 further includes an air inlet gap adjustment mechanism 162 that is arranged to adjust an axial width 172 of an axial air gap 173 through the air inlet 154. The air inlet gap adjustment mechanism 162 of the FIG. 4 aspect includes an air inlet wall 164 and an actuator 166 that is connected with the air inlet wall 164 via a linkage 168. The actuator 166 may be any type of actuator, such as a hydraulic actuator, a pneumatic actuator, an electronic actuator, or a mechanical actuator, that, when actuated, provides axial translation of the linkage 168 so as to axially translate the air inlet wall 164 in an axial upstream-downstream direction 170. The actuator 166 is controlled by the engine controller 72. The air inlet 154 is arranged between a downstream side 174 of the air inlet wall 164 and the upstream end 135 of the inner wall 132 and at least a portion of the radial wall 133. The actuator 166 is actuated so as to translate the air inlet wall 164 in the axial upstream-downstream direction 170 to adjust the axial width 172 of the axial air gap 173 to control the flow of the compressed air 80 or the flow of the compressed air 98 through the air inlet 154 into the detonation chamber 128.

The rotating detonation combustor 108 may also include one or more sensors 176 (one shown in FIG. 4) arranged upstream of the detonation chamber 128 (e.g., arranged in the air plenum 152). The one or more sensors 176 may be, for example, a temperature sensor that obtains temperature readings of the compressed air 80 or the compressed air 98 within the air plenum 152, a pressure sensor that obtains pressure readings of the compressed air 80 or the compressed air 98 within the air plenum 152, or that may measure pressure fluctuations within the air plenum 152, a flow meter sensor that obtains volumetric or velocity flow readings of the compressed air 80 or the compressed air 98 within the air plenum 152, or an accelerometer that obtains vibration readings within the air plenum 152. Sensor data 180 is sent from the one or more sensors 176 to the engine controller 72.

The rotating detonation combustor 108 may also include a plurality of operating mode detection sensors 177 (one shown in FIG. 4) within the detonation chamber 128 near the upstream end 156 of the detonation chamber 128. The plurality of operating mode detection sensors 177 may be dynamic pressure measurement sensors that measure pressure fluctuations within the detonation chamber 128, and provide sensor data 181 (e.g., pressure fluctuation data) to the engine controller 72. The plurality of operating mode detection sensors 177 may constitute, for example, three operating mode detection sensors 177 that are non-uniformly spaced apart circumferentially about the combustor centerline axis 16'. The sensor data 181 (e.g., pressure fluctuation signals) provided to the engine controller 72 are utilized by the engine controller 72 to determine the operating mode of the rotating detonation combustor 108, and the engine controller 72 can then control the axial air gap 173 accordingly to control the operating mode of the rotating detonation combustor 108.

Further, the rotating detonation combustor 108 may also include one or more sensors 178 (one shown in FIG. 4) arranged at a downstream end of the detonation chamber 128 (e.g., arranged adjacent to the outlet 146). The one or more sensors 178 may be, for example, a temperature sensor that obtains temperature readings of the combustion gases 82 or of the ramjet combustion gases 100 within the detonation chamber 128, a pressure sensor that obtains pressure readings within the detonation chamber 128 adjacent to the outlet 146, a flow meter sensor that obtains volumetric or velocity flow readings of the combustion gases 82 or of the ramjet combustion gases 100 adjacent to the outlet 146, or an accelerometer that obtains vibration readings of combustion dynamics vibrations within the detonation chamber 128. Sensor data 182 is sent from the one or more sensors 178 to the engine controller 72. Of course, additional sensors could be located at other locations within the turbine engine combustion section 20 or within the ramjet combustion section 92 to obtain addition sensor data that is provided to the engine controller 72. As will be described in more detail below, the engine controller 72 may utilize the sensor data 180 or the sensor data 182 to control the size (the axial width 172) of the axial air gap 173 to control the flow of the compressed air 80 or the flow of the compressed air 98 through the air inlet 154 into the detonation chamber 128 so as to provide for the ability to control a discharge coefficient of the rotating detonation waves within the detonation chamber 128, or to control a number of the rotating detonation waves within the detonation chamber 128.

The present disclosure is not limited to the use of the air inlet wall 164 being actuated by the actuator 166 to translate in the air inlet wall 164 in the axial upstream-downstream direction 170. Rather, the air inlet wall 164 may constitute a shape-shifting material that changes shape based on electrical or thermal actuation. In this case, the actuator 166 may provide either an electrical or a thermal stimulus to the air inlet wall 164 to expand or to contract the air inlet wall 164 so as to control the axial width 172 of the axial air gap 173. Other techniques for controlling the axial width 172 of the axial air gap 173 could also be implemented.

Figure 5:
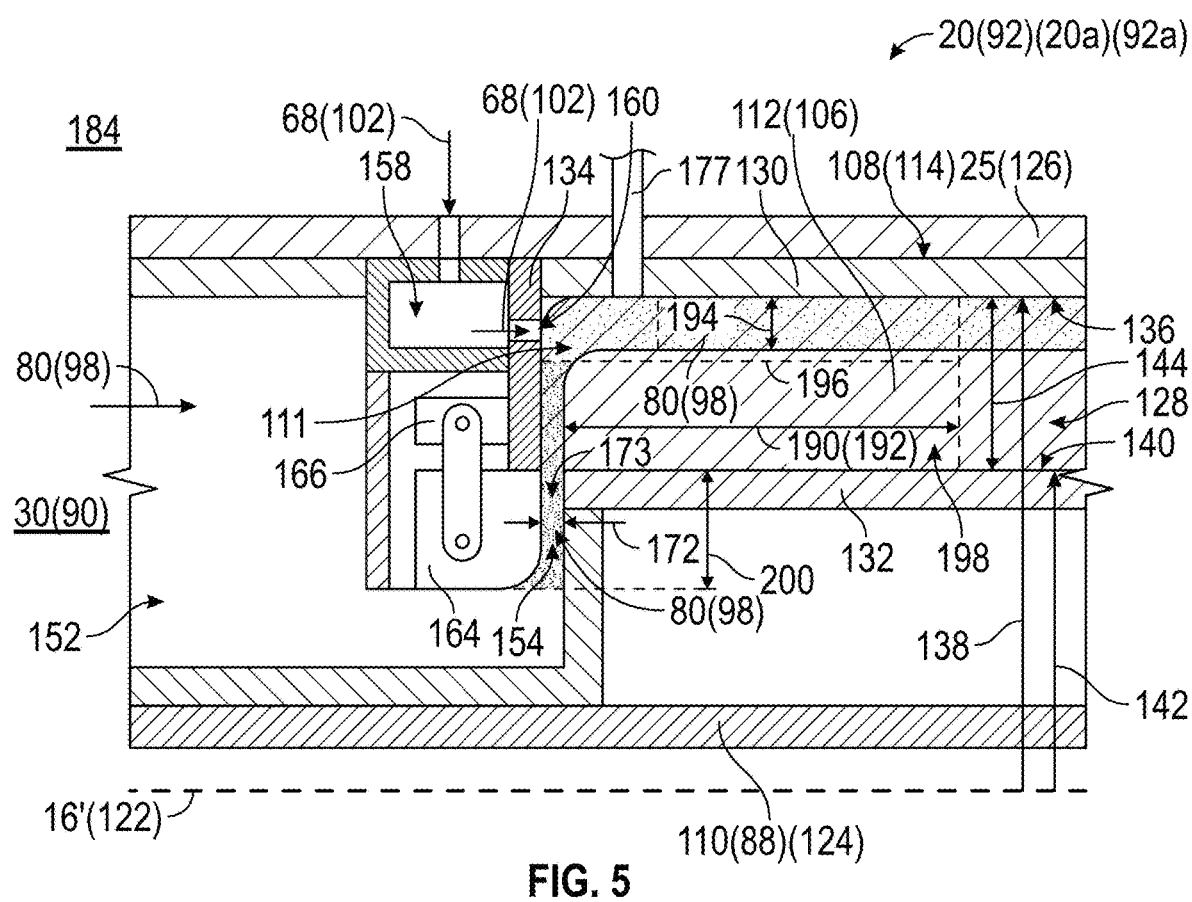
FIG. 5 is a partial cross-sectional view of a portion of the rotating detonation combustor of FIG. 4, taken at detail view 184 in FIG. 4, according to an aspect of the present disclosure.

FIG. 5 is a partial cross-sectional view of a portion of the rotating detonation combustor 108 of FIG. 4, taken at detail view 184 in FIG. 4, according to an aspect of the present disclosure. With regard to FIG. 5, a description of an operation of the rotating detonation combustor 108 will be described. As was described above, the compressed air 80 flows into the air plenum 152 from the HPC 30, and then flows through the air inlet 154 into the detonation chamber 128 (the compressed air 80 flowing through the air inlet 154 being denoted by the dark shaded area). The fuel 68 is injected into the detonation chamber 128 via the plurality of fuel injectors 160, where the fuel 68 mixes with the compressed air 80 to generate reactants in the form of a fuel-air mixture 111 (the fuel-air mixture 111 being denoted by the light shaded area having the radial height 194) that is detonated by a spark from the ignitor 155 (FIG. 4) to generate the rotating detonation waves 112 (shown generally by cross-hatching filling the radial height 144 of the detonation chamber 128).

Figure 6:
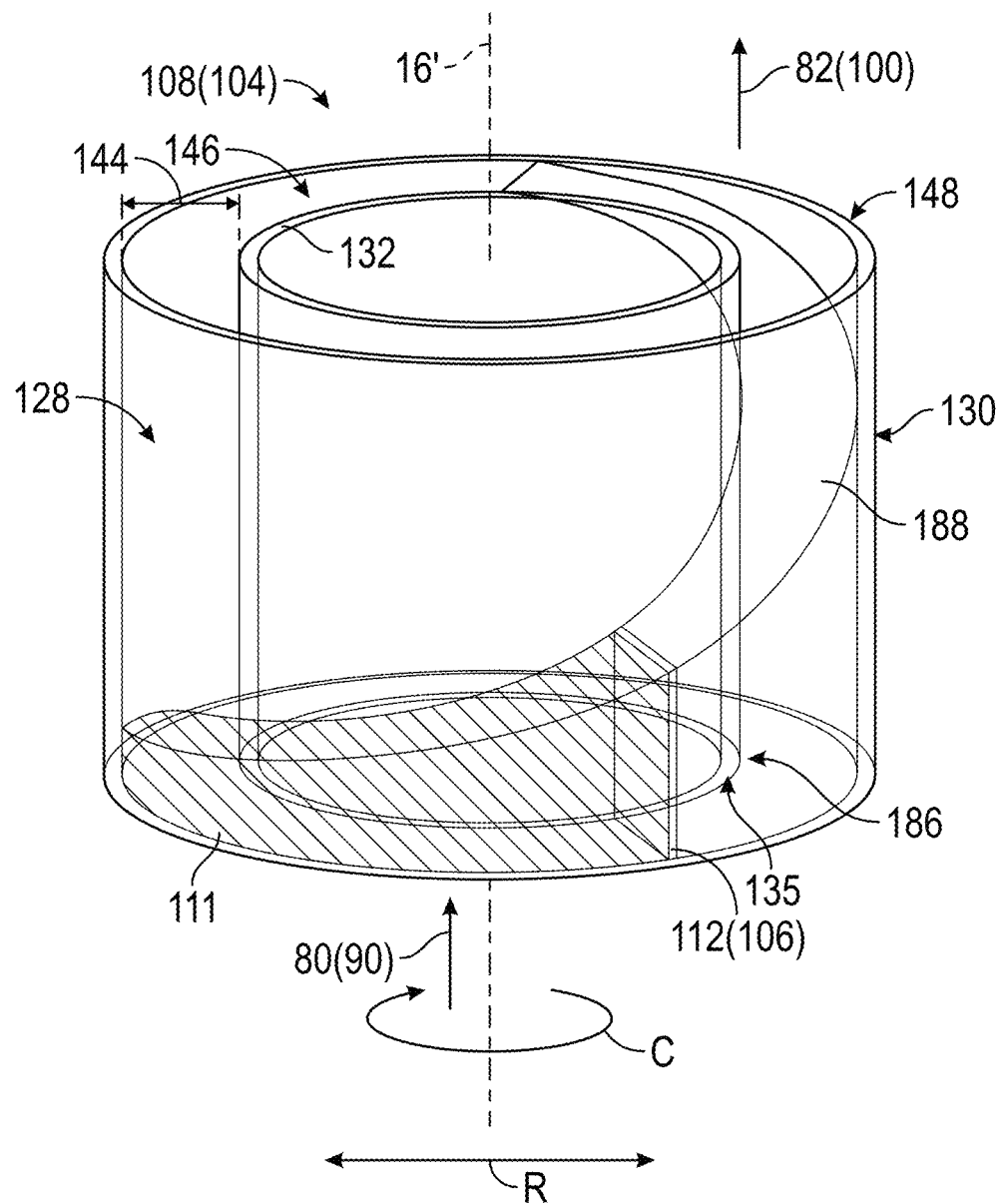
FIG. 6 is a schematic, partial cross-sectional view of the detonation chamber and a rotating detonation wave within the detonation chamber, according to an aspect of the present disclosure.

FIG. 6 is a schematic, partial cross-sectional view of the detonation chamber 128 and a rotating detonation wave 112 within the detonation chamber 128. The rotating detonation wave 112 travels in a circumferential direction C and in an axial downstream direction along the combustor centerline axis 16' within the detonation chamber 128 consuming the fuel-air mixture 111 and providing a high pressure region 186 within an expansion region 188 of the detonation chamber 128. The detonated fuel-air mixture 111 generates the rotating detonation wave 112, and combustion gases 82 from the rotating detonation wave 112 exit the detonation chamber 128 at the outlet 146. Thus, the detonation of the fuel-air mixture 111 produces a shock induced flame, which results in the coupling of a reaction zone and a shockwave. The shockwave compresses and heats the fresh fuel-air mixture 111 that is injected into the detonation chamber 128, thereby increasing the fuel-air mixture 111 above a self-ignition point. On the other side of the shockwave, energy released by the combustion contributes to the propagation of the rotating detonation waves 112. With continuous detonation, the rotating detonation wave 112 propagates around the detonation chamber 128 in a continuous manner, operating at a relatively high frequency. Additionally, the rotating detonation wave 112 may be such that an average pressure inside the detonation chamber 128 is higher than an average pressure within typical combustion systems (i.e., deflagration combustion systems). Accordingly, the high pressure region 186 behind the detonation wave 112 has a very high pressure.

While FIG. 6 depicts an example of a single rotating detonation wave 112 within the detonation chamber 128, more than one rotating detonation wave 112 may be present within the detonation chamber 128 at any one time during the operation of the rotating detonation combustor 108. For example, two rotating detonation waves 112 may be present within the detonation chamber 128 at the same time, and may have, for example, a one-hundred-eighty degrees phase difference between them. As another example, three rotating detonation waves 112 may be present within the detonation chamber 128 at the same time, and may have, for example, a one-hundred-twenty degree phase difference between them. The number of rotating detonation waves 112 that may be present within the detonation chamber 128 at any given time is dependent upon the flow of the compressed air 80 and the flow of the fuel 68 into the detonation chamber 128 to backfill the detonation chamber 128 with the fuel-air mixture 111 behind a previous rotating detonation wave 112.

Referring back to FIG. 5, upon detonation of the fuel-air mixture 111 and the generation of the rotating detonation wave 112, the rotating detonation wave 112 fills at least part of the radial height 144 of the detonation chamber 128. That is, as shown in FIG. 5, the rotating detonation wave 112 has a radial height 194 extending radially inward from the inner surface 136 of the outer wall 130 toward the inner wall 132. In addition, a portion of the detonation chamber 128 extending a given axial distance 190 downstream from the upstream wall 134 defines a presumed fill length 192 of the detonation chamber 128 for the rotating detonation wave 112. The rotating detonation wave 112, therefore, has an effective flow area 196 (also referred to as $A_{\it{eff}}$) that is defined as a function of the filled radial height 194 (also referred to as $Fill_{height}$) of the rotating detonation wave 112 for the presumed fill length 192 (also referred to as $PreFill_{length}$). Expressed another way: $A_{\it{eff}} = Fill_{height} \times PreFill_{length}$. The presumed fill length 192 and the radial height 144 of the detonation chamber 128 defines a geometric area 198 (also referred to as $A_{geo}$) of the detonation chamber 128. A discharge coefficient ($Coeff_{Discharge}$) for the rotating detonation combustor 108 is a ratio of the effective flow area ($A_{\it{eff}}$) to the geometric area ($A_{geo}$), and may be expressed as: $Coeff_{Discharge} = A_{\it{eff}}/A_{geo}$. As will be explained below, one aspect of the present disclosure is to control the discharge coefficient ($Coeff_{Discharge}$) based on cycle requirements of the turbo-engine 14 by controlling the effective flow area ($A_{\it{eff}}$) 196 of the rotating detonation wave 112 within the detonation chamber 128, while the geometric area 198 ($A_{geo}$) remains constant.

One technique for controlling the effective flow area 196 of the rotating detonation wave 112 is to control the flow of the compressed air 80 through the air inlet 154. As was described above for FIG. 4, the air inlet 154 is arranged between the downstream side 174 of the air inlet wall 164 and the radial wall 133. The air inlet wall 164 is controlled via the actuator 166 and the linkage 168 to translate in the axial upstream-downstream direction 170, which adjusts the axial width 172 of the axial air gap 173 of the air inlet 154. The adjustment of the axial width 172 of the axial air gap 173 controls the mass flow rate of the compressed air 80 through the air inlet 154 into the detonation chamber 128. The mass flow rate is expressed as: ṁ=rVA, where r=density, V=Velocity, and A=Area. The mass flow rate for an ideal compressible gas is expressed as the following equation:

$$\dot{m} = \frac{AP_0}{\sqrt{T_0}} \sqrt{\frac{\gamma}{R}} M\left(1 + \frac{\gamma-1}{2}M^2\right)^{-\frac{\gamma+1}{2(\gamma-1)}},$$

where, $P_0$=Total Pressure, $T_0$=Total Temperature, Y=Specific Heat Ratio, and M=Mach number. For mass flow choking where M=1, the mass flow rate may be expressed as:

$$\dot{m} = \frac{AP_0}{\sqrt{T_0}} \sqrt{\frac{\gamma}{R}} \left(\frac{\gamma+1}{2}\right)^{-\frac{\gamma+1}{2(\gamma-1)}}$$

Reorganizing the foregoing equation for the area A to determine the minimum area ($A_{gap\ min}$) of the axial air gap 173 for mass flow choking results in the following equation (1):

$$A_{gap\ min} = A^* = \dot{m} * \frac{\sqrt{T_0}}{P_0} * \left(\frac{\gamma+1}{2}\right)^{\frac{\gamma+1}{2(\gamma-1)}} \quad (1)$$

The maximum area ($A_{gap\ max}$) of the axial air gap 173 is where the axial air gap 173 is equal to the radial area of the detonation chamber (also referred to as the area of the annulus, or $A_{ann}$). The area of the annulus can be expressed as the following equation (2):

$$A_{ann} = \pi(r_{outer}^2 - r_{inner}^2) \quad (2)$$

where $r_{outer}$ is the radial distance 138, and $r_{inner}$ is the radial distance 142. The area of the axial air gap 173 is a function of the radial length 200 of the axial air gap 173 and the axial width 172 of the axial air gap 173. Thus, the maximum air gap ($A_{gap\ max}$) can be expressed as the following equation (3):

$$A_{gap\ max} = 2\pi r_{gap} H_{gap} = \pi(r_{outer}^2 - r_{inner}^2) \quad (3)$$

where $r_{gap}$ is the radial length 200 and $H_{gap}$ is the axial width 172.

As described above, the adjustment of the axial width 172 of the axial air gap 173 controls the mass flow rate of the compressed air 80 through the air inlet 154 into the detonation chamber 128 such that the discharge coefficient and in turn the number of detonation waves can be controlled throughout the cycle of the engine. The axial width 172 of the axial air gap 173 is preset for initial start-up and for an idle operating state of the engine so as to provide sufficient airflow to the detonation chamber 128 in order to start-up the engine and to maintain the idle operating state of the engine. Afterward, once the throttle is increased to increase the power of the engine, the actuator 166 is controlled by the engine controller 72 to adjust the axial width 172 of the axial air gap 173 by translating the air inlet wall 164 in the axial upstream-downstream direction 170. The engine controller 72 may include, or refer to, an axial gap control table stored in the engine controller 72, and provide control signals to the actuator 166 to adjust the axial width 172 of the axial air gap 173.

Table 1 below depicts an exemplary axial gap control table that may be implemented in the present disclosure. The axial gap control table may include preset values for setting the axial width 172 based on, for example, throttle power settings of the engine. In Table 1, the axial gap adjustment corresponds to an amount of an adjustment to be applied to the axial width 172, and the amount of the adjustment may be preset based on engine throttle power settings. Thus, for any given engine power setting, the engine controller 72 provides signals to the actuator 166 to control axial translation of the air inlet wall 164 to adjust the axial gap (the axial width 172) of the axial air gap 173 in order to control the mass flow of the compressed air 80 through the air inlet 154 into the detonation chamber 128. The axial gap is set so as to obtain a particular radial height 194 of the rotating detonation waves 112 within the detonation chamber 128 so as to control the effective flow area 196. While table 1 depicts throttle power in ten percent increments, additional throttle power increments (e.g., one percent increments) could be implemented instead.

TABLE 1

RDC Axial Gap Table

| | Engine Throttle Power | | | | | | | | | | |
|---|---|---|---|---|---|---|---|---|---|---|---|
| | Idle | 10% | 20% | 30% | 40% | 50% | 60% | 70% | 80% | 90% | 100% |
| Axial Gap Adjustment (mm) | 0 | 1.0 | 2.0 | 3.0 | 4.0 | 5.0 | 6.0 | 7.0 | 8.0 | 9.0 | 10.0 |

The engine controller 72 may also utilize the sensor data 180 from the sensor 176 or the sensor data 182 from the sensor 178 to control the adjustment of the axial width 172 of the axial air gap 173. For example, the axial gap control table may also include projected sensor data (e.g., projected pressure data, projected operating mode data, projected temperature data, or projected vibration data) for each of the engine throttle power settings, and then may utilize the sensor data 180, the sensor data 181, or the sensor data 182 to adjust the axial width 172 of the axial air gap 173. For instance, in the case when the engine is operating at fifty percent (50%) throttle power and the engine controller 72 provides signals to the actuator 166 to adjust the axial width 172 of the axial air gap 173 by five (5) mm, but if the sensor data 182 for the pressure or the temperature is out of a predefined projected range for the pressure or the temperature at fifty percent (50%) throttle power, the engine controller 72 may refer to additional axial gap adjustment data (not shown) within the axial gap control table to further adjust the axial width 172 of the axial air gap 173. Additionally, high speed pressure measurements acquired from multiple axial and circumferential locations by, for example, the operating mode detection sensors 177 are used to determine the operating mode of the system. If the operating mode changes to a non-ideal state during operation for a given cycle condition, the axial width 172 of the axial air gap 173 would be adjusted to alter the injection conditions of the compressed air 80 and the fuel 68 into the detonation chamber 128 and consequently, alter the operating mode of the system. Other techniques for determining the amount of the axial width adjustment could also be implemented and the present disclosure is not limited to the foregoing.

Figure 7A:
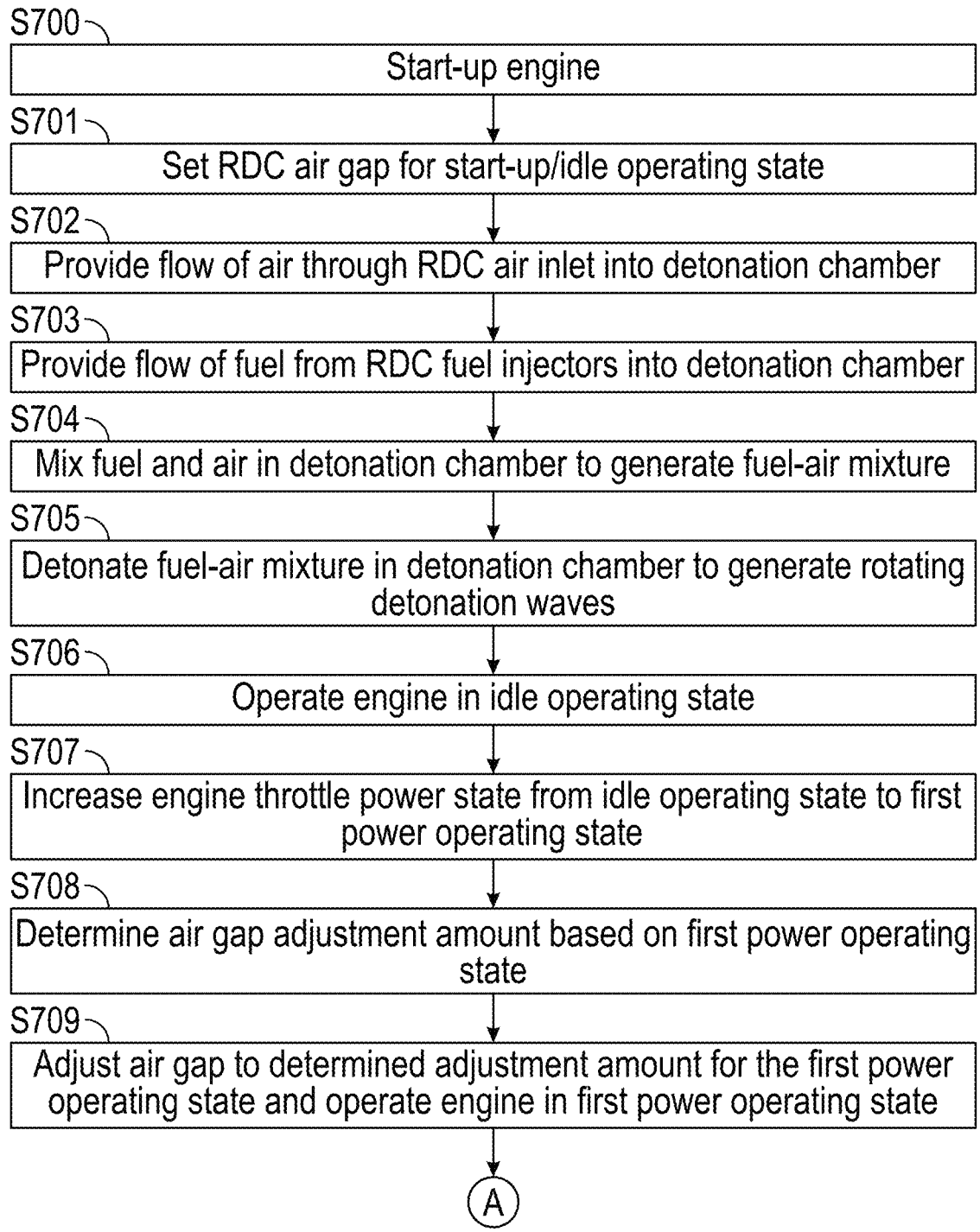
FIG. 7A and FIG. 7B depict a flowchart of process steps for a method of operating an engine having a rotating detonation combustor, according to an aspect of the present disclosure.
Figure 7B:
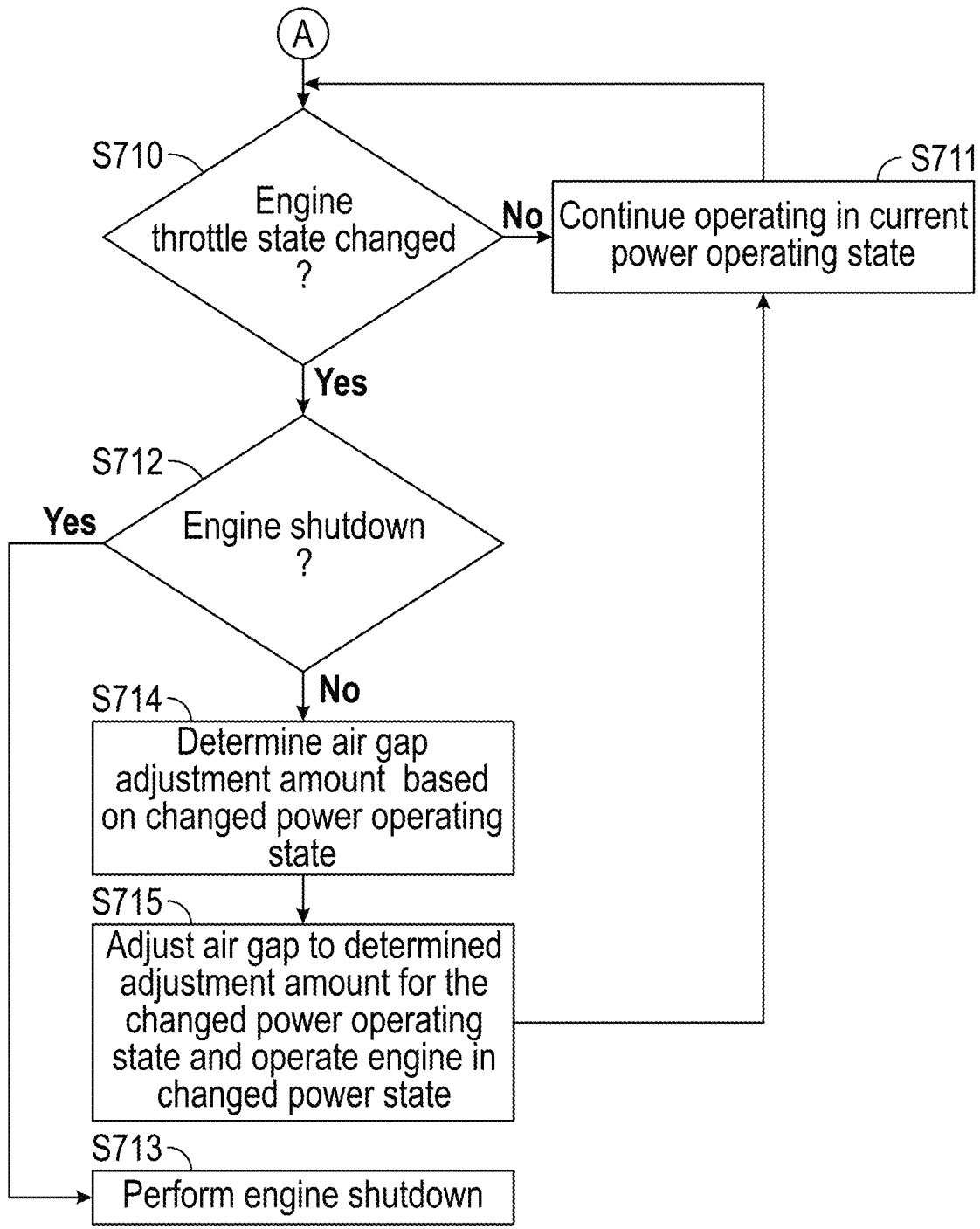

FIG. 7A and FIG. 7B depict a flowchart of process steps for a method of operating an engine having a rotating detonation combustor, according to an aspect of the present disclosure. The method may be implemented, for example, via the engine controller 72 storing in a memory (not shown) of the engine controller 72 computer-executable code of a program that is executed by a micro-processor (not shown) of the controller 72 for controlling operating of any of the rotating detonation combustor 104 or the rotating detonation combustor 108 of the propulsion system 10. The method may be implemented in, for example, the turbo-engine 14 having the rotating detonation combustor 108, or may be implemented in the ramjet engine 12 having the rotating detonation combustor 104. The following description, however, will be provided with regard to the method being implemented in the turbo-engine 14. In step S700, the turbo-engine 14 is started-up, and, in step S701, the engine controller 72 sets the axial width 172 of the axial air gap 173 in the rotating detonation combustor 108. As described above, the engine controller 72 may set the axial width 172 to a preset value for the engine start-up and idle operating state of the turbo-engine 14. As the engine starts-up, the compressor section 18 starts turning the LPC 26, the IPC 28, and the HPC 30 to generate the flow of compressed air 80 that is provided to the turbine engine combustion section 20. As described above with regard to FIG. 4 and FIG. 5, the compressed air 80 flows into the air plenum 152 and through the air inlet 154 into the detonation chamber 128. Continuing with the engine start-up, in step S703, the flow of the fuel 68 is provided from the fuel plenum 158 and through the fuel injectors 160 into the detonation chamber 128. In step S704, the fuel 68 and the compressed air 80 is mixed within the detonation chamber 128 to generate the fuel-air mixture 111 (FIG. 5), and, in step S705, the fuel-air mixture 111 is detonated by a spark from the ignitor 155 to generate the rotating detonation waves 112. Once the turbo-engine 14 has been started-up, the operation of the turbo-engine 14, and in particular, the operation of the rotating detonation combustor 108 is controlled by the engine controller 72 from step S706 through step S715. In step S706, the engine controller 72 controls the operation of the turbo-engine 14 to be operated in an idle power operating state.

Next, in step S707, the turbo-engine 14 is operated to increase the engine throttle power state from the idle power operating state to a first power operating state (e.g., a low-power operating state) greater than the idle power operating state. For example, the engine throttle power state may be increased from the idle power operating state to a ten percent (10%) power operating state to commence taxiing of an aircraft upon which the turbo-engine 14 is connected. In step S708, the engine controller 72, based on the increase in the engine throttle power operating state to the first power operating state, determines an air gap adjustment amount for adjusting the axial width 172 of the axial air gap 173. As described above, the engine controller 72 may refer to the axial gap control table to determine the air gap adjustment amount, or may utilize the sensor data 180 or the sensor data 182 to determine the air gap adjustment amount. In step S709, the engine controller 72 provides signals to the actuator 166 to translate the air inlet wall 164 so as to adjust the axial width 172 of the axial air gap 173 based on the determined air gap adjustment amount. The actuator 166 operates, based on the signals received from the engine controller 72, to translate the air inlet wall 164 to adjust the axial width 172 of the axial air gap 173. The adjustment of the axial air gap 173 provides for increasing the flow of the compressed air 80 through the air inlet 154 into the detonation chamber 128 so as to control the radial height 194 of the fuel-air mixture 111 within the detonation chamber 128 and to control the discharge coefficient of the rotating detonation combustor 108.

Referring to FIG. 7B, in step S710, the engine controller 72 determines whether the engine throttle power operating state has changed. For example, the engine controller 72 may receive signals from an engine throttle control device within the cockpit if the pilot changes (i.e., either increases or decreases) the engine throttle power state. In the foregoing description, the first power operating state (low-power operating state) was described as being ten percent (10%) for commencing taxiing of the aircraft. Here, in step S710, the pilot may commence a take-off procedure by increasing the engine throttle for a second power operating state (i.e., a high-power operating state) to eighty percent (80%) for rollout and take-off of the aircraft. In this case, the engine controller 72 receives signals from the engine throttle control device and the determination in step S710 is YES. On the other hand, if the engine controller 72 determines that no change in the engine throttle power operating state has occurred (NO in step S710), then, in step S711, the turbo-engine 14 continues operating in the current power operating state (in this case, the turbo-engine 14 continues operating in the first power operating state).

When the determination in step S710 is YES, then, in step S712, the engine controller 72 may determine whether or not the change in the engine throttle power operating state is to shut down the turbo-engine 14. If so (YES in step S712), then, in step S713, the engine controller 72 initiates a shutdown operation of the turbo-engine 14. If not (NO in step S712), then the engine controller 72 determines that another change in the engine throttle power operating state (i.e., an increase in the power or a decrease in the power) has occurred and, in step S714, the engine controller 72 determines the air gap adjustment amount based on the changed (second) power operating state. For example, when the engine throttle power operating state has changed from the first power operating state (low-power operating state) of ten percent (10%) to the second power operating state (high-power operating state) of eighty percent (80%), the engine controller 72 refers to the air gap adjustment table to determine the amount of the air gap adjustment to be applied for the eighty percent (80%) engine power. In step S715, the engine controller 72 provides signals to the actuator 166 to adjust the axial width 172 of the axial air gap 173 to apply the air gap adjustment. The flow of FIG. 7B then returns to step S711 where the turbo-engine 14 continues to operate in the current (second) power operating state until a further change in the engine throttle power operating state is detected again, in step S710. This loop in the process (from step S710, step S711, step S714, step S715, and back to step S711) continues through the full cycle (i.e., from start-up, taxiing, take-off, cruise, landing, taxiing to the gate) of the turbo-engine 14 until the shut down of the turbo-engine 14 in step S713.

The foregoing process provides the ability to change the inlet airflow to the detonation chamber 128 throughout the entire cycle of the operation of the turbo-engine 14 so that the discharge coefficient within the detonation chamber 128 can be controlled. By controlling the discharge coefficient, a more efficient burn of the fuel-air mixture can be achieved. In addition, the control of the inlet airflow to the detonation chamber 128 provides the ability to change the number of rotating detonation waves 112 within the detonation chamber 128 based on the cycle requirements. For example, for higher power operating states, the inlet airflow can be increased so as to increase the number of rotating detonation waves 112 in order to better meet the higher power cycle requirements. Similarly, for lower power operating states, the number of rotating detonation waves 112 can be reduced by reducing the inlet airflow to the detonation chamber 128 to meet the lower power cycle requirements and to reduce fuel usage.

Figure 8:
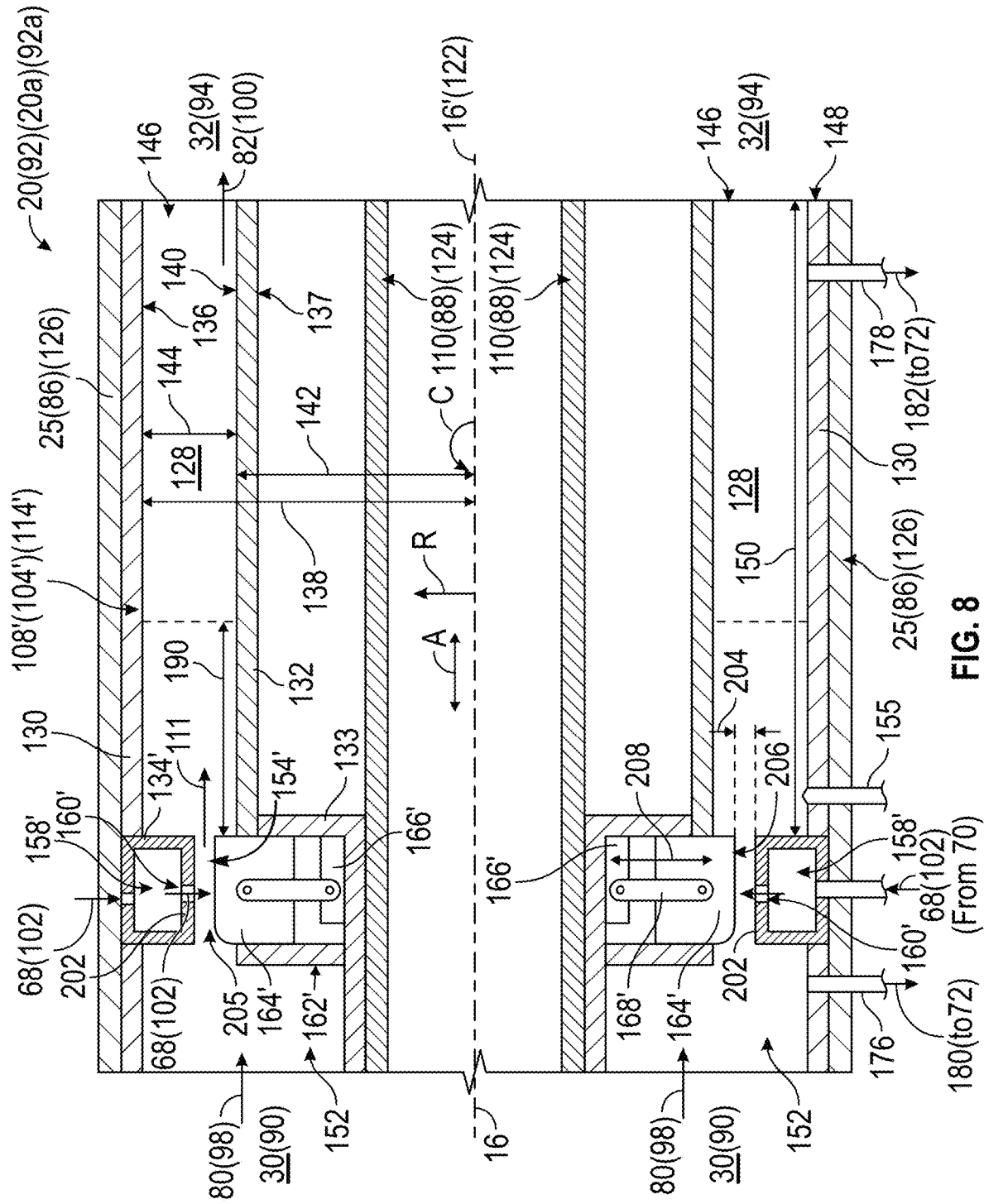
FIG. 8 is a partial cross-sectional view of an alternate rotating detonation combustor to the rotating detonation combustor of FIG. 4, according to an aspect of the present disclosure.

FIG. 8 is a partial cross-sectional view of an alternate rotating detonation combustor 108' to the rotating detonation combustor 108 of FIG. 4, according to an aspect of the present disclosure. In FIG. 8, elements that are same as those for the FIG. 4 aspect include the same reference numerals and the description provided above for FIG. 4 is equally applicable to those same elements in FIG. 8. A main difference between the rotating detonation combustor 108 of FIG. 4 and the alternate rotating detonation combustor 108' of FIG. 8 is that, rather than the air inlet 154 (FIG. 4) being arranged radially to inject the compressed air 80 into the detonation chamber 128 in the radial direction R, an air inlet 154' extends in the axial direction A and extends circumferentially about the combustor centerline axis 16'. In addition, in the FIG. 8 aspect, a plurality of fuel injectors 160' extend through an inner wall 202 of a fuel plenum 158' to inject the fuel 68 into the air inlet 154' so that the fuel 68 mixes with the compressed air 80 within the air inlet 154'. A fuel-air mixture 111' is injected from the air inlet 154' into the detonation chamber 128.

A radial height 204 of the air inlet 154' is defined between the inner wall 202 of the fuel plenum 158' and a radially outer surface 206 of an air inlet wall 164' so as to define a radial air gap 205. The radial height 204 of the radial air gap 205 can be adjusted by an air inlet gap adjustment mechanism 162' by translating the radially outer surface 206 of the air inlet wall 164' in a radially inward-outward direction 208 so as to increase the radial height 204 of the air inlet 154', or to decrease the radial height 204 of the air inlet 154'. The radially outer surface 206 of the air inlet wall 164' can be translated radially inward and radially outward via an actuator 166' that is connected with the air inlet wall 164' via a linkage 168'.

In the same manner described above for the FIG. 4 aspect, the radial height 204 of the air inlet 154 can be adjusted based on the engine throttle power operating states of the turbo-engine 14. Thus, the radial height 204 can be adjusted to be increased or decreased so as to adjust the mass flow rate of the compressed air 80 through the air inlet 154 into the detonation chamber 128. In the same manner described above for FIG. 4 and FIG. 5, the discharge coefficient and the number of rotating detonation waves 112 within the detonation chamber 128 can be controlled.

Further aspects of the present disclosure are provided by the subject matter of the following clauses.

A method of operating a rotating detonation combustor, the rotating detonation combustor including (a) a detonation chamber defined by an outer wall, an inner wall, and an upstream wall, (b) an outlet at a downstream end of the detonation chamber, the detonation chamber having a detonation chamber length defined by a distance extending from the upstream wall to the outlet, (c) an air inlet wall arranged at an upstream end of the detonation chamber and defining, at least in part, an air inlet, and (d) at least one fuel injector arranged to inject fuel into the detonation chamber, the method including providing a flow of air through the air inlet to flow into the detonation chamber, providing a flow of fuel from the at least one fuel injector into the detonation chamber, mixing the flow of the fuel and the flow of the air in the detonation chamber to generate a fuel-air mixture, detonating the fuel-air mixture in the detonation chamber to generate rotating detonation waves within the detonation chamber; and controlling, by an engine controller, during operation of the rotating detonation combustor from a first power operating state to a second power operating state, different from the first power operating state, the air inlet wall to control the flow of the air through the air inlet into the detonation chamber to control a discharge coefficient within the detonation chamber and to control an operating mode of the rotating detonation combustor.

The method according to the preceding clause, wherein the at least one fuel injector extends through the upstream wall.

The method according to any preceding clause, wherein the first power operating state is a low-power operating state of the rotating detonation combustor, and the second power operating state is a high-power operating state of the rotating detonation combustor.

The method according to any preceding clause, wherein the rotating detonation combustor further includes a fuel plenum in fluid communication with the at least one fuel injector, and the providing the flow of fuel from the at least one fuel injector into the detonation chamber includes providing a flow of the fuel from the fuel plenum to the at least one fuel injector.

The method according to any preceding clause, wherein the rotating detonation combustor further includes an air plenum arranged in fluid communication with the air inlet, the air plenum providing a flow of the air to the air inlet.

The method according to any preceding clause, wherein the controlling the air inlet wall to control the flow of the air through the air inlet is executed by a controller utilizing at least one combustor cycle requirement table.

The method according to any preceding clause, wherein the inner wall extends circumferentially about a combustor longitudinal centerline axis and extends longitudinally with respect to the combustor longitudinal centerline axis, and the outer wall extends circumferentially about the combustor longitudinal centerline axis and extends longitudinally with respect to the combustor longitudinal centerline axis, a radial distance between the inner wall and the outer wall defining a detonation chamber height.

The method according to any preceding clause, wherein a portion of the detonation chamber extending downstream from the upstream wall to a given axial distance from the upstream wall defines a presumed fill length of the fuel-air mixture within the detonation chamber, and the detonation chamber height and the presumed fill length define a geometric area of the detonation chamber, and the discharge coefficient is a ratio of an effective flow area of the fuel-air mixture within the detonation chamber to the geometric area of the detonation chamber.

The method according to any preceding clause, wherein the effective flow area of the fuel-air mixture is a function of a radial height of the fuel-air mixture extending radially inward from the outer wall toward the inner wall, for the presumed fill length of the detonation chamber.

The method according to any preceding clause, wherein the rotating detonation combustor further includes an air inlet gap adjustment mechanism that includes the air inlet wall and that controls a size of an air gap of the air inlet to control the flow of the air into the detonation chamber.

The method according to any preceding clause, wherein the air inlet gap adjustment mechanism includes an actuator that actuates the air inlet wall to translate the air inlet wall to adjust the size of the air gap of the air inlet.

The method according to any preceding clause, wherein the air inlet extends longitudinally through the upstream wall, and is arranged between an inner wall of a fuel plenum and a radially outer surface of the air inlet wall, and the air inlet wall is radially translatable with respect to the combustor longitudinal centerline axis.

The method according to any preceding clause, wherein at least one fuel injector is arranged through the inner wall of the fuel plenum to inject the fuel from the fuel plenum into the air inlet upstream of the detonation chamber.

The method according to any preceding clause, wherein the controlling the flow of the air through the air inlet comprises translating the air inlet wall in a radial direction with respect to the combustor longitudinal centerline axis to change a radial height of the air inlet between the inner wall of the fuel plenum and the radially outer surface of the air inlet wall.

The method according to any preceding clause, wherein the air inlet is defined, at least partially, between a downstream side of the air inlet wall and a radial wall extending radially inward from an upstream end of the inner wall.

The method according to any preceding clause, wherein the air inlet extends radially between the downstream side of the air inlet wall and the radial wall, and the flow of air from the air inlet into the detonation chamber is a radial flow of air, with respect to the combustor longitudinal centerline axis, into the detonation chamber.

The method according to any preceding clause, wherein the air inlet wall is axially translatable by the air inlet gap adjustment mechanism to adjust an axial width of the air inlet between the downstream side of the air inlet wall and the radial wall.

The method according to any preceding clause, wherein the controlling the flow of the air through the air inlet comprises the actuator translating the air inlet wall in an axial direction with respect to the combustor longitudinal centerline axis to change the axial width of the air inlet.

The method according to any preceding clause, wherein the rotating detonation combustor further includes a plurality of operating mode detection sensors that provide pressure fluctuation data to the engine controller, and the engine controller controls the operating mode of the rotating detonation combustor by, at least in part, controlling the flow of air through the air inlet into the detonation chamber.

The method according to any preceding clause, wherein the controlling the operating mode is based on at least one of a number of detonation waves, an orientation of the detonation waves, and a presence or orientation or number of detrimental acoustic waves within the detonation chamber.

A method of operating a gas turbine engine including a compressor section, a combustion section, and a turbine section, the compressor section providing a flow of compressed air to the combustion section, the combustion section including a rotating detonation combustor including (a) a detonation chamber defined by an outer wall, an inner wall, and an upstream wall, (b) an outlet at a downstream end of the detonation chamber, the detonation chamber having a detonation chamber length defined by a distance extending from the upstream wall to the outlet, (c) an air inlet wall arranged at an upstream end of the detonation chamber and defining, at least in part, an air inlet, and (d) at least one fuel injector arranged to inject fuel into the detonation chamber, the method including providing a flow of air through the air inlet to flow into the detonation chamber, providing a flow of fuel from the at least one fuel injector into the detonation chamber, mixing the flow of the fuel and the flow of the air in the detonation chamber to generate a fuel-air mixture, detonating the fuel-air mixture in the detonation chamber to generate rotating detonation waves within the detonation chamber; and controlling, by an engine controller, during operation of the rotating detonation combustor from a first power operating state to a second power operating state, different from the first power operating state, the air inlet wall to control the flow of the air through the air inlet into the detonation chamber to control a discharge coefficient within the detonation chamber and to control an operating mode of the rotating detonation combustor.

The method according to the preceding clause, wherein the at least one fuel injector extends through the upstream wall.

The method according to any preceding clause, wherein the first power operating state is a low-power operating state of the rotating detonation combustor, and the second power operating state is a high-power operating state of the rotating detonation combustor.

The method according to any preceding clause, wherein the rotating detonation combustor further includes a fuel plenum in fluid communication with the at least one fuel injector, and the providing the flow of fuel from the at least one fuel injector into the detonation chamber includes providing a flow of the fuel from the fuel plenum to the at least one fuel injector.

The method according to any preceding clause, wherein the rotating detonation combustor further includes an air plenum arranged in fluid communication with the air inlet, the air plenum providing a flow of the air to the air inlet.

The method according to any preceding clause, wherein the controlling the air inlet wall to control the flow of the air through the air inlet is executed by a controller utilizing at least one combustor cycle requirement table.

The method according to any preceding clause, wherein the inner wall extends circumferentially about a combustor longitudinal centerline axis and extends longitudinally with respect to the combustor longitudinal centerline axis, and the outer wall extends circumferentially about the combustor longitudinal centerline axis and extends longitudinally with respect to the combustor longitudinal centerline axis, a radial distance between the inner wall and the outer wall defining a detonation chamber height.

The method according to any preceding clause, wherein a portion of the detonation chamber extending downstream from the upstream wall to a given axial distance from the upstream wall defines a presumed fill length of the fuel-air mixture within the detonation chamber, and the detonation chamber height and the presumed fill length define a geometric area of the detonation chamber, and the discharge coefficient is a ratio of an effective flow area of the fuel-air mixture within the detonation chamber to the geometric area of the detonation chamber.

The method according to any preceding clause, wherein the effective flow area of the fuel-air mixture is a function of a radial height of the fuel-air mixture extending radially inward from the outer wall toward the inner wall, for the presumed fill length of the detonation chamber.

The method according to any preceding clause, wherein the rotating detonation combustor further includes an air inlet gap adjustment mechanism that includes the air inlet wall and that controls a size of an air gap of the air inlet to control the flow of the air into the detonation chamber.

The method according to any preceding clause, wherein the air inlet gap adjustment mechanism includes an actuator that actuates the air inlet wall to translate the air inlet wall to adjust the size of the air gap of the air inlet.

The method according to any preceding clause, wherein the air inlet extends longitudinally through the upstream wall, and is arranged between an inner wall of a fuel plenum and a radially outer surface of the air inlet wall, and the air inlet wall is radially translatable with respect to the combustor longitudinal centerline axis.

The method according to any preceding clause, wherein at least one fuel injector is arranged through the inner wall of the fuel plenum to inject the fuel from the fuel plenum into the air inlet upstream of the detonation chamber.

The method according to any preceding clause, wherein the controlling the flow of the air through the air inlet comprises translating the air inlet wall in a radial direction with respect to the combustor longitudinal centerline axis to change a radial height of the air inlet between the inner wall of the fuel plenum and the radially outer surface of the air inlet wall.

The method according to any preceding clause, wherein the air inlet is defined, at least partially, between a downstream side of the air inlet wall and a radial wall extending radially inward from an upstream end of the inner wall.

The method according to any preceding clause, wherein the air inlet extends radially between the downstream side of the air inlet wall and the radial wall, and the flow of air from the air inlet into the detonation chamber is a radial flow of air, with respect to the combustor longitudinal centerline axis, into the detonation chamber.

The method according to any preceding clause, wherein the air inlet wall is axially translatable by the air inlet gap adjustment mechanism to adjust an axial width of the air inlet between the downstream side of the air inlet wall and the radial wall.

The method according to any preceding clause, wherein the controlling the flow of the air through the air inlet comprises the actuator translating the air inlet wall in an axial direction with respect to the combustor longitudinal centerline axis to change the axial width of the air inlet.

The method according to any preceding clause, wherein the rotating detonation combustor further includes a plurality of operating mode detection sensors that provide pressure fluctuation data to the engine controller, and the engine controller controls the operating mode of the rotating detonation combustor by, at least in part, controlling the flow of air through the air inlet into the detonation chamber.

The method according to any preceding clause, wherein the controlling the operating mode is based on at least one of a number of detonation waves, an orientation of the detonation waves, and a presence or orientation or number of detrimental acoustic waves within the detonation chamber.

A method of operating a propulsion system including a gas turbine engine and a ramjet engine, the gas turbine engine including a compressor section, a combustion section, and a turbine section, the compressor section providing a flow of compressed air to the combustion section, and the ramjet engine including an inlet section, a ramjet combustion section, and an exhaust nozzle section, wherein at least one of the combustion section or the ramjet combustion section including a rotating detonation combustor including (a) a detonation chamber defined by an outer wall, an inner wall, and an upstream wall, (b) an outlet at a downstream end of the detonation chamber, the detonation chamber having a detonation chamber length defined by a distance extending from the upstream wall to the outlet, (c) an air inlet wall arranged at an upstream end of the detonation chamber and defining, at least in part, an air inlet, and (d) at least one fuel injector arranged to inject fuel into the detonation chamber, the method including providing a flow of air through the air inlet to flow into the detonation chamber, providing a flow of fuel from the at least one fuel injector into the detonation chamber, mixing the flow of the fuel and the flow of the air in the detonation chamber to generate a fuel-air mixture, detonating the fuel-air mixture in the detonation chamber to generate rotating detonation waves within the detonation chamber; and controlling, by an engine controller, during operation of the rotating detonation combustor from a first power operating state to a second power operating state, different from the first power operating state, the air inlet wall to control the flow of the air through the air inlet into the detonation chamber to control a discharge coefficient within the detonation chamber and to control an operating mode of the rotating detonation combustor.

The method according to the preceding clause, wherein the at least one fuel injector extends through the upstream wall.

The method according to any preceding clause, wherein the first power operating state is a low-power operating state of the rotating detonation combustor, and the second power operating state is a high-power operating state of the rotating detonation combustor.

The method according to any preceding clause, wherein the rotating detonation combustor further includes a fuel plenum in fluid communication with the at least one fuel injector, and the providing the flow of fuel from the at least one fuel injector into the detonation chamber includes providing a flow of the fuel from the fuel plenum to the at least one fuel injector.

The method according to any preceding clause, wherein the rotating detonation combustor further includes an air plenum arranged in fluid communication with the air inlet, the air plenum providing a flow of the air to the air inlet.

The method according to any preceding clause, wherein the controlling the air inlet wall to control the flow of the air through the air inlet is executed by a controller utilizing at least one combustor cycle requirement table.

The method according to any preceding clause, wherein the inner wall extends circumferentially about a combustor longitudinal centerline axis and extends longitudinally with respect to the combustor longitudinal centerline axis, and the outer wall extends circumferentially about the combustor longitudinal centerline axis and extends longitudinally with respect to the combustor longitudinal centerline axis, a radial distance between the inner wall and the outer wall defining a detonation chamber height.

The method according to any preceding clause, wherein a portion of the detonation chamber extending downstream from the upstream wall to a given axial distance from the upstream wall defines a presumed fill length of the fuel-air mixture within the detonation chamber, and the detonation chamber height and the presumed fill length define a geometric area of the detonation chamber, and the discharge coefficient is a ratio of an effective flow area of the fuel-air mixture within the detonation chamber to the geometric area of the detonation chamber.

The method according to any preceding clause, wherein the effective flow area of the fuel-air mixture is a function of a radial height of the fuel-air mixture extending radially inward from the outer wall toward the inner wall, for the presumed fill length of the detonation chamber.

The method according to any preceding clause, wherein the rotating detonation combustor further includes an air inlet gap adjustment mechanism that includes the air inlet wall and that controls a size of an air gap of the air inlet to control the flow of the air into the detonation chamber.

The method according to any preceding clause, wherein the air inlet gap adjustment mechanism includes an actuator that actuates the air inlet wall to translate the air inlet wall to adjust the size of the air gap of the air inlet.

The method according to any preceding clause, wherein the air inlet extends longitudinally through the upstream wall, and is arranged between an inner wall of a fuel plenum and a radially outer surface of the air inlet wall, and the air inlet wall is radially translatable with respect to the combustor longitudinal centerline axis.

The method according to any preceding clause, wherein at least one fuel injector is arranged through the inner wall of the fuel plenum to inject the fuel from the fuel plenum into the air inlet upstream of the detonation chamber.

The method according to any preceding clause, wherein the controlling the flow of the air through the air inlet comprises translating the air inlet wall in a radial direction with respect to the combustor longitudinal centerline axis to change a radial height of the air inlet between the inner wall of the fuel plenum and the radially outer surface of the air inlet wall.

The method according to any preceding clause, wherein the air inlet is defined, at least partially, between a downstream side of the air inlet wall and a radial wall extending radially inward from an upstream end of the inner wall.

The method according to any preceding clause, wherein the air inlet extends radially between the downstream side of the air inlet wall and the radial wall, and the flow of air from the air inlet into the detonation chamber is a radial flow of air, with respect to the combustor longitudinal centerline axis, into the detonation chamber.

The method according to any preceding clause, wherein the air inlet wall is axially translatable by the air inlet gap adjustment mechanism to adjust an axial width of the air inlet between the downstream side of the air inlet wall and the radial wall.

The method according to any preceding clause, wherein the controlling the flow of the air through the air inlet comprises the actuator translating the air inlet wall in an axial direction with respect to the combustor longitudinal centerline axis to change the axial width of the air inlet.

The method according to any preceding clause, wherein the rotating detonation combustor further includes a plurality of operating mode detection sensors that provide pressure fluctuation data to the engine controller, and the engine controller controls the operating mode of the rotating detonation combustor by, at least in part, controlling the flow of air through the air inlet into the detonation chamber.

The method according to any preceding clause, wherein the controlling the operating mode is based on at least one of a number of detonation waves, an orientation of the detonation waves, and a presence or orientation or number of detrimental acoustic waves within the detonation chamber.

A propulsion system for an aircraft including, in a serial flow relationship, an air inlet section, a combustion section, and an exhaust section, and a controller, wherein the combustion section includes a rotating detonation combustor including (a) a detonation chamber defined by an outer wall, an inner wall, and an upstream wall, (b) an outlet at a downstream end of the detonation chamber, the detonation chamber having a detonation chamber length defined by a distance extending from the upstream wall to the outlet, (c) an air inlet wall arranged at an upstream end of the detonation chamber and defining, at least in part, an air inlet, and (d) at least one fuel injector arranged to inject fuel into the detonation chamber, wherein, in operation of the propulsion system controlled by the controller, (i) a flow of air is provided from the air inlet section to the rotating detonation combustor such that flow of air flows through the air inlet to flow into the detonation chamber, (ii) a flow of fuel is provided from the at least one fuel injector into the detonation chamber, (iii) the flow of the fuel and the flow of the air are mixed together in the detonation chamber to generate a fuel-air mixture, (iv) the fuel-air mixture is detonated in the detonation chamber to generate rotating detonation waves within the detonation chamber, and (v) during the operation of the rotating detonation combustor from a first power operating state to a second power operating state, different from the first power operating state, the air inlet wall is controlled to control the flow of the air through the air inlet into the detonation chamber to control a discharge coefficient within the detonation chamber and to control an operating mode of the rotating detonation combustor.

The propulsion system according to the preceding clause, wherein the at least one fuel injector extends through the upstream wall.

The propulsion system according to any preceding clause, wherein the first power operating state is a low-power operating state of the rotating detonation combustor, and the second power operating state is a high-power operating state of the rotating detonation combustor.

The propulsion system according to any preceding clause, wherein the rotating detonation combustor further includes a fuel plenum in fluid communication with the at least one fuel injector, and the providing the flow of fuel from the at least one fuel injector into the detonation chamber includes providing a flow of the fuel from the fuel plenum to the at least one fuel injector.

The propulsion system according to any preceding clause, wherein the rotating detonation combustor further includes an air plenum arranged in fluid communication with the air inlet, the air plenum providing a flow of the air to the air inlet.

The propulsion system according to any preceding clause, wherein the air inlet wall is controlled to control the flow of the air through the air inlet is executed by a controller utilizing at least one combustor cycle requirement table.

The propulsion system according to any preceding clause, wherein the inner wall extends circumferentially about a combustor longitudinal centerline axis and extends longitudinally with respect to the combustor longitudinal centerline axis, and the outer wall extends circumferentially about the combustor longitudinal centerline axis and extends longitudinally with respect to the combustor longitudinal centerline axis, a radial distance between the inner wall and the outer wall defining a detonation chamber radial height.

The propulsion system according to any preceding clause, wherein a portion of the detonation chamber extending downstream from the upstream wall to a given axial distance from the upstream wall defines a presumed fill length of the fuel-air mixture within the detonation chamber, and the detonation chamber radial height and the presumed fill length define a geometric area of the detonation chamber, and the discharge coefficient is a ratio of an effective flow area of the fuel-air mixture within the detonation chamber to the geometric area of the detonation chamber.

The propulsion system according to any preceding clause, wherein the effective flow area of the fuel-air mixture is a function of a radial height of the fuel-air mixture extending radially inward from the outer wall toward the inner wall, for the presumed fill length of the detonation chamber.

The propulsion system according to any preceding clause, wherein the rotating detonation combustor further includes an air inlet gap adjustment mechanism that includes the air inlet wall and that controls a size of an air gap of the air inlet to control the flow of the air into the detonation chamber.

The propulsion system according to any preceding clause, wherein the air inlet gap adjustment mechanism includes an actuator that actuates the air inlet wall to translate the air inlet wall to adjust the size of the air gap of the air inlet.

The propulsion system according to any preceding clause, wherein the air inlet extends longitudinally through the upstream wall, and is arranged between an inner wall of a fuel plenum and a radially outer surface of the air inlet wall, and the air inlet wall is radially translatable with respect to the combustor longitudinal centerline axis.

The propulsion system according to any preceding clause, wherein at least one fuel injector is arranged through the inner wall of the fuel plenum to inject the fuel from the fuel plenum into the air inlet upstream of the detonation chamber.

The propulsion system according to any preceding clause, wherein the controlling the flow of the air through the air inlet comprises translating the air inlet wall in a radial direction with respect to the combustor longitudinal centerline axis to change a radial height of the air inlet between the inner wall of the fuel plenum and the radially outer surface of the air inlet wall.

The propulsion system according to any preceding clause, wherein the air inlet is defined, at least partially, between a downstream side of the air inlet wall and a radial wall extending radially inward from an upstream end of the inner wall.

The propulsion system according to any preceding clause, wherein the air inlet extends radially between the downstream side of the air inlet wall and the radial wall, and the flow of air from the air inlet into the detonation chamber is a radial flow of air, with respect to the combustor longitudinal centerline axis, into the detonation chamber.

The propulsion system according to any preceding clause, wherein the air inlet wall is axially translatable by the air inlet gap adjustment mechanism to adjust an axial width of the air inlet between the downstream side of the air inlet wall and the radial wall.

The propulsion system according to any preceding clause, wherein the controlling the flow of the air through the air inlet comprises the actuator translating the air inlet wall in an axial direction with respect to the combustor longitudinal centerline axis to change the axial width of the air inlet.

The propulsion system according to any preceding clause, wherein the rotating detonation combustor further includes a plurality of operating mode detection sensors that provide pressure fluctuation data to the engine controller, and the engine controller controls the operating mode of the rotating detonation combustor by, at least in part, controlling the flow of air through the air inlet into the detonation chamber.

The propulsion system according to any preceding clause, wherein the controlling the operating mode is based on at least one of a number of detonation waves, an orientation of the detonation waves, and a presence or orientation or number of detrimental acoustic waves within the detonation chamber.

A non-transitory computer-readable storage medium storing computer-executable code of program for a controller to control operating a rotating detonation combustor, the rotating detonation combustor including (a) a detonation chamber defined by an outer wall, an inner wall, and an upstream wall, (b) an outlet at a downstream end of the detonation chamber, the detonation chamber having a detonation chamber length defined by a distance extending from the upstream wall to the outlet, (c) an air inlet wall arranged at an upstream end of the detonation chamber and defining, at least in part, an air inlet, and (d) at least one fuel injector arranged to inject fuel into the detonation chamber, the method executed by the controller including (i) providing a flow of air through the air inlet to flow into the detonation chamber, (ii) providing a flow of fuel from the at least one fuel injector into the detonation chamber, (iii) mixing the flow of the fuel and the flow of the air in the detonation chamber to generate a fuel-air mixture, (iv) detonating the fuel-air mixture in the detonation chamber to generate rotating detonation waves within the detonation chamber, and (v) controlling, by an engine controller, during operation of the rotating detonation combustor from a first power operating state to a second power operating state, different from the first power operating state, the air inlet wall to control the flow of the air through the air inlet into the detonation chamber to control a discharge coefficient within the detonation chamber and to control an operating mode of the rotating detonation combustor.

The non-transitory computer-readable storage medium according to the preceding clause, wherein the at least one fuel injector extends through the upstream wall.

The non-transitory computer-readable storage medium according to any preceding clause, wherein the first power operating state is a low-power operating state of the rotating detonation combustor, and the second power operating state is a high-power operating state of the rotating detonation combustor.

The non-transitory computer-readable storage medium according to any preceding clause, wherein the rotating detonation combustor further includes a fuel plenum in fluid communication with the at least one fuel injector, and the providing the flow of fuel from the at least one fuel injector into the detonation chamber includes providing a flow of the fuel from the fuel plenum to the at least one fuel injector.

The non-transitory computer-readable storage medium according to any preceding clause, wherein the rotating detonation combustor further includes an air plenum arranged in fluid communication with the air inlet, the air plenum providing a flow of the air to the air inlet.

The non-transitory computer-readable storage medium according to any preceding clause, wherein the controlling the air inlet wall to control the flow of the air through the air inlet is executed by a controller utilizing at least one combustor cycle requirement table.

The non-transitory computer-readable storage medium according to any preceding clause, wherein the inner wall extends circumferentially about a combustor longitudinal centerline axis and extends longitudinally with respect to the combustor longitudinal centerline axis, and the outer wall extends circumferentially about the combustor longitudinal centerline axis and extends longitudinally with respect to the combustor longitudinal centerline axis, a radial distance between the inner wall and the outer wall defining a detonation chamber height.

The non-transitory computer-readable storage medium according to any preceding clause, wherein a portion of the detonation chamber extending downstream from the upstream wall to a given axial distance from the upstream wall defines a presumed fill length of the fuel-air mixture within the detonation chamber, and the detonation chamber height and the presumed fill length define a geometric area of the detonation chamber, and the discharge coefficient is a ratio of an effective flow area of the fuel-air mixture within the detonation chamber to the geometric area of the detonation chamber.

The non-transitory computer-readable storage medium according to any preceding clause, wherein the effective flow area of the fuel-air mixture is a function of a radial height of the fuel-air mixture extending radially inward from the outer wall toward the inner wall, for the presumed fill length of the detonation chamber.

The non-transitory computer-readable storage medium according to any preceding clause, wherein the rotating detonation combustor further includes an air inlet gap adjustment mechanism that includes the air inlet wall and that controls a size of an air gap of the air inlet to control the flow of the air into the detonation chamber.

The non-transitory computer-readable storage medium according to any preceding clause, wherein the air inlet gap adjustment mechanism includes an actuator that actuates the air inlet wall to translate the air inlet wall to adjust the size of the air gap of the air inlet.

The non-transitory computer-readable storage medium according to any preceding clause, wherein the air inlet extends longitudinally through the upstream wall, and is arranged between an inner wall of a fuel plenum and a radially outer surface of the air inlet wall, and the air inlet wall is radially translatable with respect to the combustor longitudinal centerline axis.

The non-transitory computer-readable storage medium according to any preceding clause, wherein at least one fuel injector is arranged through the inner wall of the fuel plenum to inject the fuel from the fuel plenum into the air inlet upstream of the detonation chamber.

The non-transitory computer-readable storage medium according to any preceding clause, wherein the controlling the flow of the air through the air inlet comprises translating the air inlet wall in a radial direction with respect to the combustor longitudinal centerline axis to change a radial height of the air inlet between the inner wall of the fuel plenum and the radially outer surface of the air inlet wall.

The non-transitory computer-readable storage medium according to any preceding clause, wherein the air inlet is defined, at least partially, between a downstream side of the air inlet wall and a radial wall extending radially inward from an upstream end of the inner wall.

The non-transitory computer-readable storage medium according to any preceding clause, wherein the air inlet extends radially between the downstream side of the air inlet wall and the radial wall, and the flow of air from the air inlet into the detonation chamber is a radial flow of air, with respect to the combustor longitudinal centerline axis, into the detonation chamber.

The non-transitory computer-readable storage medium according to any preceding clause, wherein the air inlet wall is axially translatable by the air inlet gap adjustment mechanism to adjust an axial width of the air inlet between the downstream side of the air inlet wall and the radial wall.

The non-transitory computer-readable storage medium according to any preceding clause, wherein the controlling the flow of the air through the air inlet comprises the actuator translating the air inlet wall in an axial direction with respect to the combustor longitudinal centerline axis to change the axial width of the air inlet.

The non-transitory computer-readable storage medium according to any preceding clause, wherein the rotating detonation combustor further includes a plurality of operating mode detection sensors that provide pressure fluctuation data to the engine controller, and the engine controller controls the operating mode of the rotating detonation combustor by, at least in part, controlling the flow of air through the air inlet into the detonation chamber.

The non-transitory computer-readable storage medium according to any preceding clause, wherein the controlling the operating mode is based on at least one of a number of detonation waves, an orientation of the detonation waves, and a presence or orientation or number of detrimental acoustic waves within the detonation chamber.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

We claim:

1. A method of operating a rotating detonation combustor, the rotating detonation combustor including (a) a detonation chamber defined by an outer wall, an inner wall, and an upstream wall, (b) an outlet at a downstream end of the detonation chamber, the detonation chamber having a detonation chamber length defined by a distance extending from the upstream wall to the outlet, (c) an air inlet wall arranged at an upstream end of the detonation chamber and defining, at least in part, an air inlet, and (d) at least one fuel injector arranged to inject fuel into the detonation chamber, the method comprising:

providing a flow of air through the air inlet to flow into the detonation chamber;

providing a flow of the fuel from the at least one fuel injector into the detonation chamber;

mixing the flow of the fuel and the flow of the air in the detonation chamber to generate a fuel-air mixture;

detonating the fuel-air mixture in the detonation chamber to generate rotating detonation waves within the detonation chamber; and controlling, by an engine controller, during operation of the rotating detonation combustor from a first power operating state to a second power operating state, different from the first power operating state, the air inlet wall to control the flow of the air through the air inlet into the detonation chamber to control a discharge coefficient within the detonation chamber and to control an operating mode of the rotating detonation combustor.

2. The method according to claim 1, wherein the at least one fuel injector extends through the upstream wall.

3. The method according to claim 1, wherein the first power operating state is a low-power operating state of the rotating detonation combustor, and the second power operating state is a high-power operating state of the rotating detonation combustor.

4. The method according to claim 1, wherein the rotating detonation combustor further includes a fuel plenum in fluid communication with the at least one fuel injector, and the providing the flow of the fuel from the at least one fuel injector into the detonation chamber includes providing the fuel from the fuel plenum to the at least one fuel injector.

5. The method according to claim 1, wherein the rotating detonation combustor further includes an air plenum arranged in fluid communication with the air inlet, the air plenum providing the air to the air inlet.

6. The method according to claim 1, wherein the controlling the air inlet wall to control the flow of the air through the air inlet is executed by a controller utilizing at least one combustor cycle requirement table.

7. The method according to claim 1, wherein the inner wall extends circumferentially about a combustor longitudinal centerline axis and extends longitudinally with respect to the combustor longitudinal centerline axis, and the outer wall extends circumferentially about the combustor longitudinal centerline axis and extends longitudinally with respect to the combustor longitudinal centerline axis, a radial distance between the inner wall and the outer wall defining a detonation chamber radial height.

8. The method according to claim 7, wherein a portion of the detonation chamber extending downstream from the upstream wall to a given axial distance from the upstream wall defines a presumed fill length of the fuel-air mixture within the detonation chamber, and the detonation chamber radial height and the presumed fill length define a geometric area of the detonation chamber, and the discharge coefficient is a ratio of an effective flow area of the fuel-air mixture within the detonation chamber to the geometric area of the detonation chamber.

9. The method according to claim 8, wherein the effective flow area of the fuel-air mixture is a function of a radial height of the fuel-air mixture extending radially inward from the outer wall toward the inner wall, for the presumed fill length of the detonation chamber.

10. The method according to claim 9, wherein the rotating detonation combustor further includes an air inlet gap adjustment mechanism that includes the air inlet wall and that controls a size of an air gap of the air inlet to control the flow of the air into the detonation chamber.

11. The method according to claim 10, wherein the air inlet gap adjustment mechanism includes an actuator that actuates the air inlet wall to translate the air inlet wall to adjust the size of the air gap of the air inlet.

12. The method according to claim 11, wherein the air inlet extends longitudinally through the upstream wall, and is arranged between an inner wall of a fuel plenum and a radially outer surface of the air inlet wall, and the air inlet wall is radially translatable with respect to the combustor longitudinal centerline axis.

13. The method according to claim 12, wherein the at least one fuel injector is arranged through the inner wall of the fuel plenum to inject the fuel from the fuel plenum into the air inlet upstream of the detonation chamber.

14. The method according to claim 13, wherein the controlling the flow of the air through the air inlet comprises translating the air inlet wall in a radial direction with respect to the combustor longitudinal centerline axis to change a radial height of the air inlet between the inner wall of the fuel plenum and the radially outer surface of the air inlet wall.

15. The method according to claim 11, wherein the air inlet is defined, at least partially, between a downstream side of the air inlet wall and a radial wall extending radially inward from an upstream end of the inner wall.

16. The method according to claim 15, wherein the air inlet extends radially between the downstream side of the air inlet wall and the radial wall, and the flow of air from the air inlet into the detonation chamber is a radial flow of air, with respect to the combustor longitudinal centerline axis, into the detonation chamber.

17. The method according to claim 16, wherein the air inlet wall is axially translatable by the air inlet gap adjustment mechanism to adjust an axial width of the air inlet between the downstream side of the air inlet wall and the radial wall.

18. The method according to claim 17, wherein the controlling the flow of the air through the air inlet comprises the actuator translating the air inlet wall in an axial direction with respect to the combustor longitudinal centerline axis to change the axial width of the air inlet.

19. The method according to claim 1, wherein the rotating detonation combustor further includes a plurality of operating mode detection sensors that provide pressure fluctuation data to the engine controller, and the engine controller controls the operating mode of the rotating detonation combustor by, at least in part, controlling the flow of air through the air inlet into the detonation chamber.

20. The method according to claim 19, wherein the controlling the operating mode is based on at least one of a number of detonation waves, an orientation of the detonation waves, and a presence or orientation or number of detrimental acoustic waves within the detonation chamber.

* * * * *